(12) United States Patent
Wang et al.

(10) Patent No.: US 10,968,118 B2
(45) Date of Patent: Apr. 6, 2021

(54) SUBSEA EQUIPMENT CLEANING SYSTEM AND METHOD

(71) Applicant: VETCO GRAY SCANDINAVIA AS, Stravanger (NO)

(72) Inventors: Hua Wang, Niskayuna, NY (US); Zijun Xia, Shanghai (CN); Jose Luis Plasencia Cabanillas, Blommenholm (NO)

(73) Assignee: VETCO GRAY SCANDINAVIA AS, Stravanger (NO)

( * ) Notice: Subject to any disclaimer, the term of this patent is extended or adjusted under 35 U.S.C. 154(b) by 341 days.

(21) Appl. No.: 15/755,621

(22) PCT Filed: Jul. 20, 2016

(86) PCT No.: PCT/US2016/043034
§ 371 (c)(1),
(2) Date: Feb. 27, 2018

(87) PCT Pub. No.: WO2017/039859
PCT Pub. Date: Mar. 9, 2017

(65) Prior Publication Data
US 2018/0251386 A1 Sep. 6, 2018

(30) Foreign Application Priority Data
Aug. 31, 2015 (CN) .......................... 201510547877.7

(51) Int. Cl.
*C02F 1/46* (2006.01)
*C02F 1/461* (2006.01)
(Continued)

(52) U.S. Cl.
CPC .......... *C02F 1/4602* (2013.01); *B01D 61/022* (2013.01); *B01D 61/10* (2013.01);
(Continued)

(58) Field of Classification Search
CPC ...... C02F 1/4602; C02F 1/441; C02F 1/4618; C02F 1/42; C02F 2001/4619;
(Continued)

(56) References Cited

U.S. PATENT DOCUMENTS

| 2009/0145773 A1* | 6/2009 | Herrington | ............... C02F 1/44 205/687 |
|---|---|---|---|
| 2013/0020079 A1 | 1/2013 | Hopkins et al. | |
| 2015/0231533 A1 | 8/2015 | Riviere et al. | |

FOREIGN PATENT DOCUMENTS

| CN | 101541687 A | 9/2009 |
|---|---|---|
| CN | 104250827 A | 12/2014 |

(Continued)

OTHER PUBLICATIONS

International Search Report and Written Opinion issued in connection with corresponding PCT Application No. PCT/US2016/043034 dated Sep. 28, 2016.

(Continued)

*Primary Examiner* — Arun S Phasge
(74) *Attorney, Agent, or Firm* — Baker Hughes Patent Organization

(57) ABSTRACT

The invention concerns a subsea water processing system comprising an electrochemical unit that uses raw or treated seawater to generate high pH and low pH solutions that are used to clean at least one subsea process apparatus during a cleaning cycle by circulation through the at least one subsea process apparatus via acid or base flow lines connecting the electrochemical unit with the subsea process apparatus on-site.

20 Claims, 16 Drawing Sheets

Figure 1:
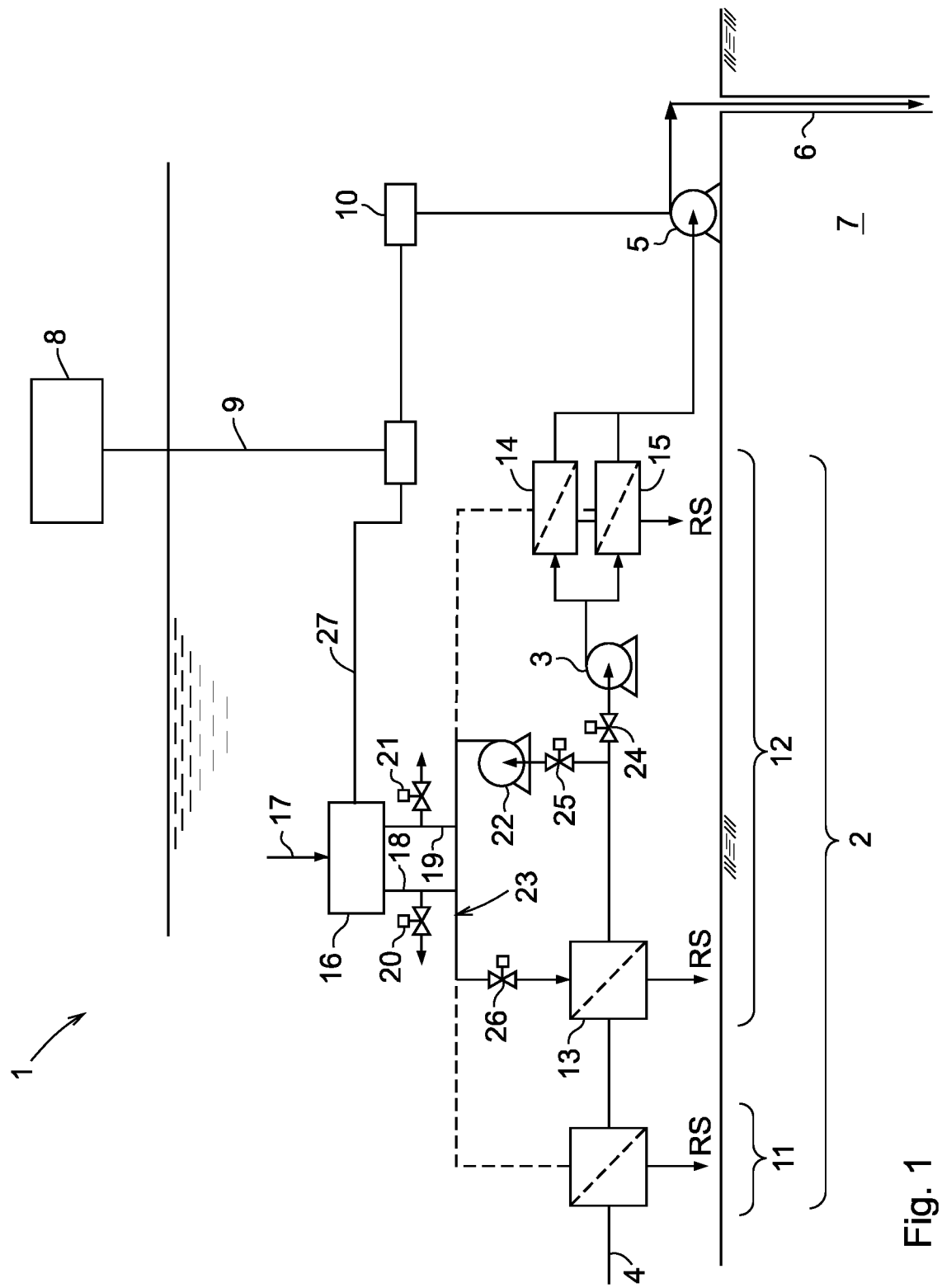

(51) Int. Cl.
| | |
|---|---|
| B01D 61/02 | (2006.01) |
| B01D 61/42 | (2006.01) |
| B01D 61/10 | (2006.01) |
| B01D 61/44 | (2006.01) |
| C02F 1/44 | (2006.01) |
| B01D 65/02 | (2006.01) |
| B01D 61/20 | (2006.01) |
| B01D 61/58 | (2006.01) |
| E21B 43/40 | (2006.01) |
| E21B 37/08 | (2006.01) |
| E21B 43/36 | (2006.01) |
| C02F 1/42 | (2006.01) |
| C02F 103/10 | (2006.01) |
| C02F 1/469 | (2006.01) |
| C02F 103/08 | (2006.01) |
| B01D 61/14 | (2006.01) |
| C02F 103/02 | (2006.01) |
| C02F 103/36 | (2006.01) |
| E21B 43/20 | (2006.01) |

(52) U.S. Cl.
CPC ............ *B01D 61/20* (2013.01); *B01D 61/422* (2013.01); *B01D 61/445* (2013.01); *B01D 61/58* (2013.01); *B01D 65/02* (2013.01); *C02F 1/441* (2013.01); *C02F 1/4618* (2013.01); *E21B 37/08* (2013.01); *E21B 43/36* (2013.01); *E21B 43/40* (2013.01); *B01D 61/025* (2013.01); *B01D 61/027* (2013.01); *B01D 61/145* (2013.01); *B01D 61/147* (2013.01); *B01D 2311/04* (2013.01); *B01D 2311/2623* (2013.01); *B01D 2313/90* (2013.01); *B01D 2317/025* (2013.01); *B01D 2321/162* (2013.01); *B01D 2321/164* (2013.01); *C02F 1/42* (2013.01); *C02F 1/442* (2013.01); *C02F 1/444* (2013.01); *C02F 1/4693* (2013.01); *C02F 2001/4619* (2013.01); *C02F 2001/46185* (2013.01); *C02F 2103/023* (2013.01); *C02F 2103/08* (2013.01); *C02F 2103/10* (2013.01); *C02F 2103/365* (2013.01); *C02F 2201/001* (2013.01); *C02F 2201/46115* (2013.01); *C02F 2301/08* (2013.01); *C02F 2303/14* (2013.01); *C02F 2303/20* (2013.01); *C02F 2303/22* (2013.01); *E21B 43/20* (2013.01)

(58) Field of Classification Search
CPC ........ C02F 2301/08; C02F 2201/46115; C02F 2303/20; C02F 2103/10; C02F 1/4693; C02F 1/144; C02F 2303/22; C02F 1/442; C02F 2103/08; C02F 2103/023; C02F 2103/365; C02F 2001/46185; C02F 2303/14; C02F 2201/001; B01D 61/10; B01D 61/445; B01D 65/02; B01D 61/20; B01D 61/58; B01D 61/022; B01D 61/422; B01D 2313/90; B01D 61/025; B01D 2311/04; B01D 61/147; B01D 2317/025; B01D 2321/162; B01D 61/027; B01D 61/145; B01D 2321/164; B01D 2311/2623; E21B 43/40; E21B 37/08; E21B 43/36; E21B 43/20
See application file for complete search history.

(56) References Cited

FOREIGN PATENT DOCUMENTS

| GB | 2 430 196 A | 3/2007 |
| WO | 00/24432 A1 | 5/2000 |
| WO | 2007/073198 A1 | 6/2007 |
| WO | 2012/087537 A1 | 6/2012 |

OTHER PUBLICATIONS

International Preliminary Report on Patentability issued in connection with corresponding PCT Application No, PCT/US2016/043034 dated Mar. 6, 2018.

First Office Action and Search issued in connection with corresponding CN Application No. 201510547877.7 dated Dec. 26, 2018 (English Translation not available).

\* cited by examiner

SUBSEA EQUIPMENT CLEANING SYSTEM AND METHOD

TECHNICAL FIELD OF THE INVENTION

The present invention relates to subsea processing systems useful for processing of oil, gas, seawater (for injection), and produced water and methods for cleaning these subsea processing systems. Subsea processing systems include equipment for separation, pumping, gas compression, process cooling and heating, seawater injection and produced water treatment and re-injection into wells, and equipment for environmentally safe discharge of treated produced water. In particular, the invention relates to a subsea water processing system and a method for cleaning a subsea process apparatus included in the subsea water processing system.

BACKGROUND OF THE INVENTION

Water flooding is a widely used means for improved oil recovery (IOR) and has been used for more than 75 years. Water flooding is used to maintain or increase the reservoir pressure to extract the immobile oil present in the reservoir that would not otherwise naturally flow out of the reservoir. Usually this is a secondary recovery technique, however, it is being considered for primary and tertiary recovery for increased ultimate recovery.

In conventional water flooding processes for improved oil recovery, injection water can be taken from the nearest available source with little consideration to its chemical composition. Sources of injection water onshore include rivers and aquifers, while seawater or produced water is used offshore. Water is usually filtered to remove particles to avoid clogging of the formation by techniques such as media filtration, cartridge filtration, micro filtration or ultrafiltration. Certain reservoirs require sulphate removal to reduce the tendency of barium sulphate and strontium sulphate scale formation in the reservoir. Water may be injected at a pressure approximately 500 psi (35 bar) higher than reservoir pressure. Subsea single phase water injection pumps may be used in subsea applications.

Low salinity water flooding (LSF) is a process of flooding the oil reservoir with water of suitable salinity in order to economically extract additional oil from sandstone and carbonate reservoirs. The use of LSF in an oil field can also make other chemical and polymer IOR flooding techniques more efficient and provide cost savings by reducing chemical consumption. A reverse osmosis process, optionally in combination with an ultrafiltration pre-treatment step, can be used for low salinity water flooding applications. The ultrafiltration membranes remove foulants such as bacteria and suspended solids, while reverse osmosis membranes remove total dissolved solids to achieve optimal salinity suitable for enhanced oil recovery and low salinity flooding applications.

Injection of treated seawater or produced water into an offshore oil reservoir is thus a recognized method of increasing the recoverable volume of oil in place and enhancing production. For traditional offshore fields, seawater is treated on and injected from a topside installation such as a platform or FPSO (floating production, storage and offloading) unit. The biggest challenges that offshore systems must overcome are the space and weight limitations on the platform or FPSO. Injection volumes are limited by several factors and require valuable and costly topside space that should in an embodiment be used for production. Sometimes the topside water treatment options are simply not feasible (e.g. existing brown oil fields without extra topside space, remotely located satellite oil fields, fields in harsh environments or in arctic conditions). As a result, there is a trend in the oil industry to rely on subsea production systems where equipment is installed under water, e.g., on the seabed. The subsea water injection technology overcomes topside space and weight restrictions by placing equipment underwater.

The exploration and production activity in deeper waters, harsher environments and more remote locations represents a key oil and gas industry trend over the last decade, thanks to large deep water fields such as the offshore fields near the United States, Mexico, Brazil and West Africa. Today, the depth of subsea wells can reach 3,000 meters. At this depth, the ambient pressure is 300 bar (4450 psi) from the hydrostatic head and the ambient temperature is around 4° C. (38° F.).

Reinjection and discharge of produced water from surface facilities after treatment is standard practice in the offshore oil and gas industry. Proven methods are applied to ensure that wastewater disposal has no adverse effects upon marine life. Subsea produced water treatment involves water separation and purification at seabed for re-injection (for IOR), injection into subsea disposal wells, or for environmentally safe discharge at the seabed. Besides minimization of the topside equipment footprint and protection of equipment from damage by weather, subsea produced water treatment for re-injection or discharge has many additional benefits including elimination of the need to store or transport huge volumes of water from subsea production sites to the tieback hosts, as well as the advantage of reduced production system costs. It also decreases the hydrostatic pressure on the subsea production flow lines to help reduce back pressure on the subsea wellhead, and ultimately it allows for more production. Equipment for subsea produced water treatment include oil/water separation systems, gas-liquid separation systems, suspended solids separators (de-sanders), and filtration systems.

Deep subsea water treatment thus faces many challenges, including system mechanical design, electrification, control, inspection, fouling and scaling mitigation, maintenance and repair. Designs and operations that are typically used for onshore and topside in most cases cannot be directly used under the deep subsea conditions.

Today's conventional membrane systems and operational methods are designed for onshore and topsides applications. One major problem in the operation of membrane filtration subsea is membrane fouling. Membrane fouling is indicated by the flux decline of a membrane system caused by the accumulation of certain constituents in the feed water on the surface of the membrane or in the membrane matrix.

Regular chemical cleaning of membrane modules, such as Cleaning-In-Place (CIP), is an integral part of membrane process operation. Regular membrane cleaning and removal of foulants extend membrane element life and overall system performance, and has a profound impact on the performance and economics of membrane processes. In membrane CIP, acidic and basic cleaning solutions are typically required to perform high PH and low pH cleaning. Typically a high pH cleaning is used first to remove foulants such as biological matter or oil, followed by low pH cleaning to remove foulants such as mineral scale or metal oxides/metal hydroxides.

Chemical cleaning is also widely used in the prevention and remediation of scales. Scale problems can occur due to the incompatibility of the produced water with injected water or other sources of water, as is the case of the water present in drilling mud. For example, scale may precipitate during drilling, well completion, production or injection and may affect injection wells, the reservoir formation, production wells as well as the production system including pipelines and equipment. Remediation of scale deposits may be performed by mechanical methods, acid treatment or a combination of both. Acid washes for scale removal that may be combined with water jetting are typically used to remove scales from heat exchangers, pipes, injection wells, production wells and related equipment. Electrodes in electrolyser cells (like electrochlorinators or similar equipment) are also subject to scale deposition and therefore may require acid for remediation.

Acid for reservoir stimulation is also a common practice that can significantly increase the production rates. In this process acid is injected into the well to penetrate the rock pores in order to increase the permeability of the rock.

CIP is well established for typical land based applications. On such land based applications; chemical storage, mixing, delivery, and heating/cooling operations, all necessary components of the CIP, is generally not an issue. However, the conventional CIP systems and operation methods face many challenges in offshore applications, both topside and subsea.

For topside membrane and other process applications the chemical storage and conventional CIP equipment require valuable space on a platform or FPSO.

For deepwater membrane applications, subsea chemical storage needed for conventional CIP is most likely out of the question as the necessary chemical storage units are massive and costly. If chemical storage units are on topside and the membrane systems are at the seabed, long and costly umbilicals will be needed to deliver and return CIP chemicals to/from subsea water treatment units, and may compromise projects in deeper waters and longer distance step-out wells.

An underwater treatment unit having cleaning means suitable for cleaning filtration membranes at great water depths is previously known and disclosed in WO2014044978 A1. A heating means is arranged for heating the membrane followed by injection of water and cleaning agent (acid or base solution) each of which are stored in a water storage tank and at least one cleaning product tank.

SUMMARY OF THE INVENTION

Embodiments of the present invention overcome the limitations of the current conventional CIP systems and operation methods applicable to membrane operation, injection and production process equipment as well as reservoir stimulation, enabling a robust and cost effective offshore topside and subsea hydrocarbon recovery process.

The object is met in that the cleaning chemicals, including acids and bases, are generated on-site, from salts and water, both abundantly present in seawater.

The key advantages of the systems and methods disclosed in the application include:

simple and cost effective design; high reliability and availability for topside and underwater operation small and modular CIP system as the acids and bases are produced on-site and on demand, eliminating the need of massive and costly subsea chemical storage units CAPEX savings eliminates the need of long and costly umbilicals required to deliver CIP chemicals from topside CIP units to subsea water treatment systems CIP system footprint and weight reduction by avoiding chemical transportation and storage steps and equipment associated with these steps membrane system footprint and weight reduction, due to higher flux enabled by the CIP process.

stimulation of reservoir.

In a general embodiment the invention concerns a subsea water processing system wherein an acid-and-base generation unit is provided using seawater in an electrochemical process to generate high PH and low PH cleaning solutions which during a cleaning cycle are circulated, i.e. fed, through at least one subsea process apparatus via acid or base flow lines and valves connecting the acid/base generation unit on-site with the at least one subsea process apparatus to remove biological fouling and/or scaling.

In one embodiment the acid/base generation unit is an electrolysis unit. The electrolysis unit may comprise a cell and stack configuration that is undivided, 2-compartment, 3-compartment, or multi-compartment. The electrolysis unit may further contain monopolar electrodes, bipolar electrodes, porous separators, cation-exchange membranes, anion-exchange membranes, or bipolar membranes.

In one embodiment the acid/base generation unit is a bipolar membrane electro-dialysis (BPED) unit.

Bipolar membranes are a special type of two layered ion exchange membranes. They comprise two polymer layers carrying fixed charges, one of which is permeable only for anions and the other only for cations. Unlike membranes used for separation purposes, for bipolar membrane, nothing should be transported from one side to the other. The desired function is a reaction in the bipolar junction of the membrane where the anion and the cation permeable layers are in direct contact: water is split into hydroxide ions and protons by a disproportionation reaction. The produced hydroxide ion and proton are separated under electric field by migration in the respective membrane layer out of the membrane. Unlike water redox reaction at electrodes during electrolysis, no gases such as hydrogen and oxygen are formed as a side product to this reaction. Bipolar membrane electro-dialysis units are commercially available from, e.g., the companies GE Water and Process Technologies, Astom, and PC Cell GmbH. Bipolar membrane suppliers include, inter alia, GE Water and Process Technologies, FuMA-Tech GmbH and PolymerChemie Altmeier GmbH (PCA bipolar membrane).

In one or more embodiments, the present invention provides a subsea water processing system comprising a one or more coarse filtration or pre-filtration unit components of the subsea water treatment system. This coarse filtration or pre-filtration unit serves to reduce the level of particulates in the source water being processed by the subsea water treatment system and provides a filtrate substantially free of large solid particulates having a largest dimension greater than 1 microns.

In one or more embodiments, the present invention provides a subsea water processing system comprising a one or more microfiltration unit components of the subsea water processing system. This microfiltration unit serves to reduce the level of fine particulates in the source water being processed by the subsea water processing system and provides a filtrate substantially free of fine solid particulates having a largest dimension greater than 0.1-1 microns.

Suitable pre-filtration and microfiltration units are available in commerce and include those provided by GE Water (e.g. E-Series Pre-treatment Multi-Media Filters, PRO EU Series Pre-treatment Activated Carbon and Multi-Media Filters, Z.Plex* F E JX Microfiltration filter), Hydranautics (e.g. QUALSEP MF) and Koch Membrane Systems (e.g. SUPER-COR® MF Series).

In one or more embodiments, the present invention provides a subsea water processing system comprising one or more ultrafiltration membrane unit components of the subsea water processing system. This ultrafiltration membrane unit serves to reduce the level of particulates in the source water being processed by the subsea water processing system and provides an ultrafiltrate substantially free of solid particulates having a largest dimension greater than 0.1 microns. For purposes of this disclosure the term substantially free of solid particulates means that solid particulates in the ultrafiltrate having a largest dimension greater than 0.1 microns are not present in an amount exceeding 100 parts per million. In one or more embodiments, the ultrafiltrate contains less than 50 parts per million of solid particulates having a largest dimension greater than 0.1 microns. In an alternate set of embodiments, the ultrafiltrate contains less than 10 parts per million of solid particulates having a largest dimension greater than 0.1 microns.

Suitable ultrafiltration membrane units are available in commerce and include those provided by GE Power and Water (e.g. ZEEWEED hollow fiber- and G SERIES spiral wound ultrafiltration membrane units), Atech innovations GmbH (e.g. ceramic hollow fiber ultrafiltration membrane units), Qua Group (e.g. Q-SEP hollow fiber ultrafiltration membrane units), Koch Membrane Systems (e.g. PURON hollow fiber ultrafiltration membrane units), DOW (e.g. PDVF hollow fiber ultrafiltration membrane units), and TRISEP (e.g. SPIRASEP spiral wound ultrafiltration membrane units). As will be appreciated by those of ordinary skill in the art hollow fiber membranes may be single bore or polybore, and may be operated in various modes such as inside-out and outside-in flow patterns, in dead-end and cross-flow filtration modes, and in submerged or otherwise pressurized system configurations.

In one or more embodiments, the present invention provides a subsea water processing system comprising a single ultrafiltration membrane unit. In an alternate set of embodiments, the present invention provides a subsea water processing system comprising a plurality of ultrafiltration membrane units. In one or more embodiments, the ultrafiltration membrane unit may comprise hollow fiber membranes. In an alternate set of embodiments, the ultrafiltration membrane unit may comprise one or more membrane sheets. In yet another set of embodiments, the ultrafiltration membrane unit may comprise one or more membrane sheets configured in a spiral wound membrane structure.

In one or more embodiments, the subsea water processing system provided by the present invention comprises at least one nanofiltration membrane unit, at times herein referred to as a nanofiltration unit. As will be appreciated by those of ordinary skill in the art, nanofiltration units may be employed to remove sulfate ions and other divalent ions such as calcium and magnesium from the fluid being processed. Suitable nanofiltration units include those provided by GE Power and Water (e.g. SWSR and the D-Series spiral wound nanofiltration membrane units), DOW (e.g. NF-Series spiral wound nanofiltration membrane units), Hydranautics-Nitto (e.g. ESNA-Series spiral wound nanofiltration membrane units), and Koch Membrane Systems (e.g. SPIRAPRO-Series spiral wound nanofiltration membrane units).

In one or more embodiments, the nanofiltration unit is configured to receive the ultrafiltrate and produce therefrom a nanofiltrate containing less than 100 parts per million sulfate species (e.g. $CaSO_4$). In an alternate set of embodiments, the nanofiltration unit is configured to receive the ultrafiltrate and produce therefrom a nanofiltrate containing less than 50 parts per million sulfate ions ($SO_4^{2-}$). In one or more embodiments, the nanofiltrate is depleted in calcium and magnesium ions.

In one or more embodiments, the subsea water processing system provided by the present invention comprises at least one reverse osmosis membrane unit. As will be appreciated by those of ordinary skill in the art, reverse osmosis membrane units may be employed to substantially reduce the concentration of dissolved solids, such as salts, in the fluid being processed. Suitable reverse osmosis membrane units include those provided by GE Power and Water (e.g. A-Series spiral wound reverse osmosis membrane units), DOW (e.g. SW- and BW-Series spiral wound reverse osmosis membrane units), Hydranautics-Nitto (e.g. SWC-Series spiral wound reverse osmosis membrane units), and Koch Membrane Systems (e.g. Fluid System TFC-Series spiral wound reverse osmosis membrane units).

In one or more embodiments, the reverse osmosis membrane unit is configured to receive the nanofiltrate and produce therefrom a permeate substantially free of dissolved solids. In one or more alternate embodiments, the reverse osmosis membrane unit is configured to receive at least a portion of the ultrafiltrate to produce therefrom a permeate substantially free of dissolved solids. As used herein, the term substantially free of dissolved solids means that the permeate contains less than 2 percent by weight dissolved solids. In one or more embodiments, the permeate contains less than 1 percent by weight dissolved solids. In an alternate set of embodiments, the permeate contains less than 0.5 percent by weight dissolved solids. In yet another set of embodiments, the permeate contains less than 0.1 percent by weight dissolved solids.

In one or more embodiments, an underwater heat exchanger is used in a subsea processing system for cooling or heating water or a hydrocarbon-containing fluid. The temperature of a produced hydrocarbon containing stream at the sea floor is generally hot and may normally vary in temperatures in the range of 30-150° C. In order to process or transport such a hot hydrocarbon fluid stream, heat exchangers are in one embodiment used to regulate the temperature of the stream by cooling or heating the stream to a specific temperature. In another embodiment, water streams (e.g. seawater or produced water) is heated or cooled by heat exchangers. The use of seawater for the direct cooling of the relatively hot hydrocarbon containing fluids and the heating of cooling of water stream such as seawater or produced water can give rise to unwanted scaling and bio-fouling, thus requiring cleaning of surfaces in the heat exchanger.

Thus, in a first aspect of the invention the subsea water processing system briefly comprises an electrochemical unit that uses raw or treated seawater or produced water to generate high pH and low pH solutions that are used to clean at least one subsea process apparatus during a cleaning cycle by circulation through the at least one subsea process apparatus via acid or base flow lines connecting the electrochemical unit with the subsea process apparatus on-site.

In embodiments of the invention the at least one subsea process apparatus is a membrane separation module.

In embodiments of the invention the at least one subsea process apparatus is a heat exchanger.

In embodiments of the invention the at least one subsea process apparatus is a component of the hydrocarbon production system.

In embodiments of the invention the at least one subsea process apparatus is a pipeline.

In embodiments of the invention the at least one subsea process apparatus is an injection or production well.

In embodiments of the invention the at least one subsea process apparatus is a pump for injecting acid into the reservoir for reservoir stimulation.

In embodiments of the invention the subsea water processing system is a water injection system.

In embodiments of the invention the high pH solution has a pH higher than 9.5, and the low pH solution has a pH lower than 4.

In embodiments of the invention the acid/base generation unit is an electrolysis unit without membranes.

In other embodiments of the invention the acid/base generation unit is an electrolysis unit with membranes.

In embodiments of the invention the acid/base generation unit is a bipolar membrane electro-dialysis (BPED) unit.

In embodiments of the invention the acid/base generation is a bipolar membrane electro-dialysis unit with 2-compartment design or 3-compartment design.

In embodiments of the invention the acid/base generation unit can supply low PH solution for injection into the reservoir formation for hydrocarbon production stimulation.

In one or more embodiments of the invention, the feed water to the electrochemical unit has a combined $Ca^{2+}$ and $Mg^{2+}$ ions level below 10,000 mg/L, in an embodiment below 5000 mg/L, more particularly below 200 mg/L, more particularly below 50 mg/L, and even more particularly below 10 mg/L.

In one or more embodiments of the invention, the feed water to the electrochemical unit is treated by nanofiltration, ion exchange or a combination thereof to substantially remove $Ca^{2+}$ and $Mg^{2+}$ ions.

In a particular aspect the invention concerns a subsea water processing system comprising at least one underwater membrane separation module arranged in the feed line from a seawater intake to a water injection pump. An acid-and-base generation unit is provided using seawater in an electrochemical process to generate high PH and low PH cleaning solutions which during a membrane cleaning cycle are circulated through the at least one membrane separation module via acid or base flow lines and valves connecting the acid/base generation unit on-site with at least one of the membrane separation module(s) of the subsea water processing system.

In one embodiment the acid/base generation unit is, via a hydraulic circuit, hydraulically connected to the at least one underwater membrane separation module via a dedicated pump.

In one embodiment the acid/base generation unit is, via a hydraulic circuit, hydraulically connected to a boosting pump which in normal operation feeds seawater through the underwater membrane separation module(s), and which optionally feeds acid or base cleaning solution through at least one of the membrane separation module(s) during a membrane cleaning cycle.

Implementations of the on-site generation of acid and base cleaning solutions in a seawater injection system include an acid/base generation unit which via a hydraulic circuit is connectable on-site to at least one underwater membrane separation module including any of an underwater coarse filter membrane (CF), a multiple media filter membrane (MMF), a microfiltration filter membrane (MF), an ultrafiltration filter membrane (UF), a nanofiltration filter membrane (NF), a reverse osmosis filter membrane (RO), or a combination of two or more of the foregoing.

The acid/base generation unit is via a hydraulic circuit connectable on-site to at least one underwater membrane separation module including any of a single-bore or multi-bore hollow fibre membrane, a plate-and-frame membrane or a spiral wound membrane.

The acid/base generation unit is further via the hydraulic circuit connectable on-site to at least one underwater membrane separation module arranged to operate at outside-in or at inside-out flow pattern and at either dead-end or cross-filtration mode.

Embodiments of the invention include the acid/base generation unit which via a hydraulic circuit is connectable on-site to at least one underwater separation module(s) located on the seabed, or underwater near the surface, or attached to a floating platform.

In another aspect the invention concerns a method for the onsite, subsea cleaning of a subsea water processing system comprising:

hydraulically connecting an acid-and-base generation unit with the subsea or produced water process apparatus, producing high PH and low PH cleaning solutions on-site from seawater or produced water in the acid/base generation unit, circulating the cleaning solutions through the subsea process apparatus via acid and base solution flow lines and valves during a cleaning cycle.

In one embodiment the invention concerns a method for cleaning membrane(s) of a subsea water processing system comprising at least one underwater membrane separation module arranged in the feed line from a seawater intake to a water injection pump, the method comprising:

hydraulically connecting an acid-and-base generation unit with at least one underwater membrane separation module, producing low PH and high PH cleaning solutions on-site from seawater or treated produced water in the acid/base generation unit, circulating the cleaning solutions through the membrane (s) of the at least one underwater membrane separation module via acid and base solution flow lines and valves during a cleaning cycle.

In one embodiment the method further comprises:

arranging and operating a boosting pump for feeding seawater through the underwater membrane separation module(s) in normal operation, connecting the acid/base generation unit hydraulically to the boosting pump, and optionally operating the boosting pump for feeding the on-site generated low PH or high PH solution through at least one underwater membrane separation module in a membrane cleaning cycle.

In another embodiment the method for cleaning a subsea process apparatus the high PH and low PH cleaning solutions can be recombined in-line or in a tank to neutralize each other before discharge.

In another embodiment the method the high PH and low PH cleaning of the subsea process apparatus is performed as a "once through process" and does not require recirculation.

BREIF DESCRIPTION OF THE DRAWINGS

Figure 13:
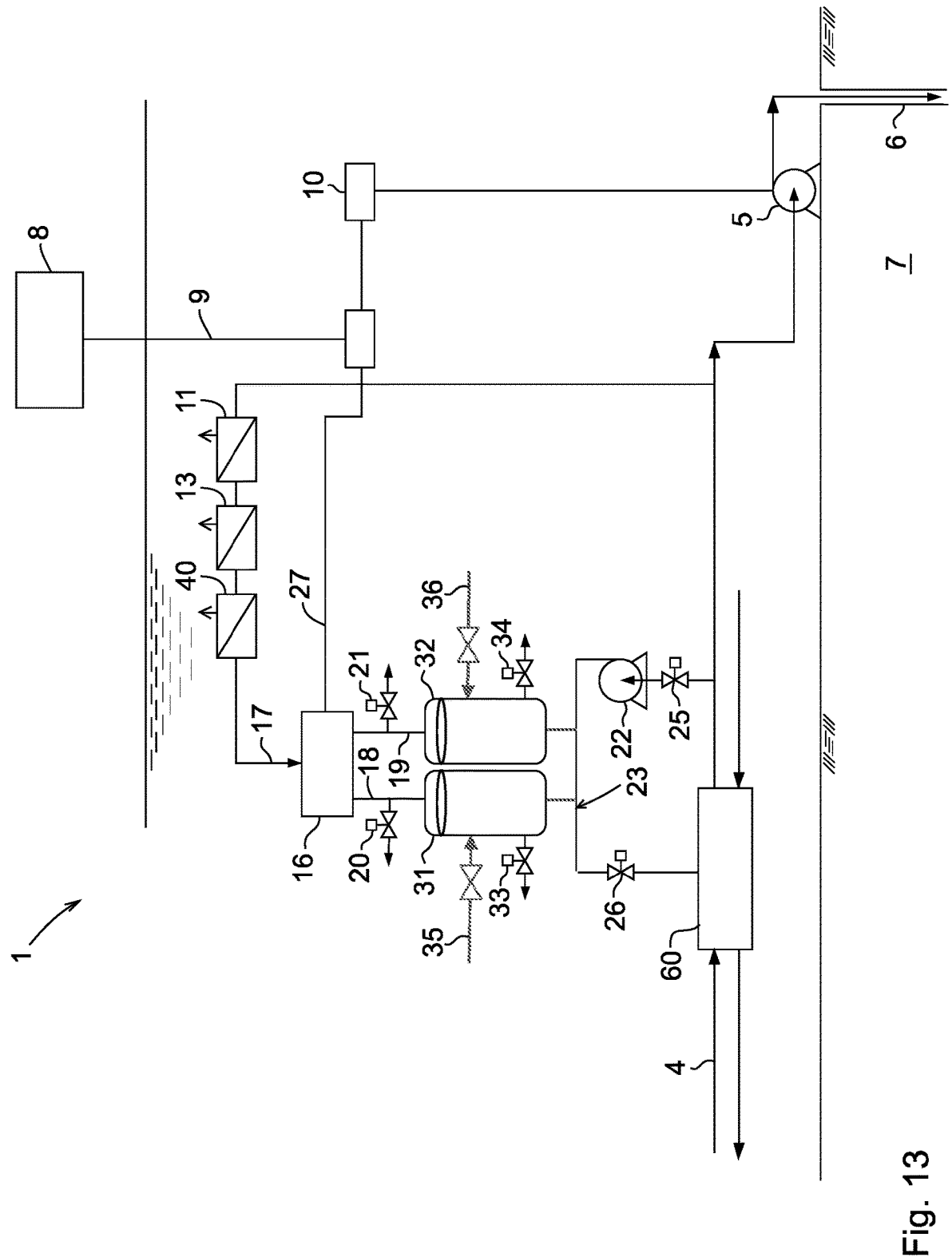
Figure 14A:
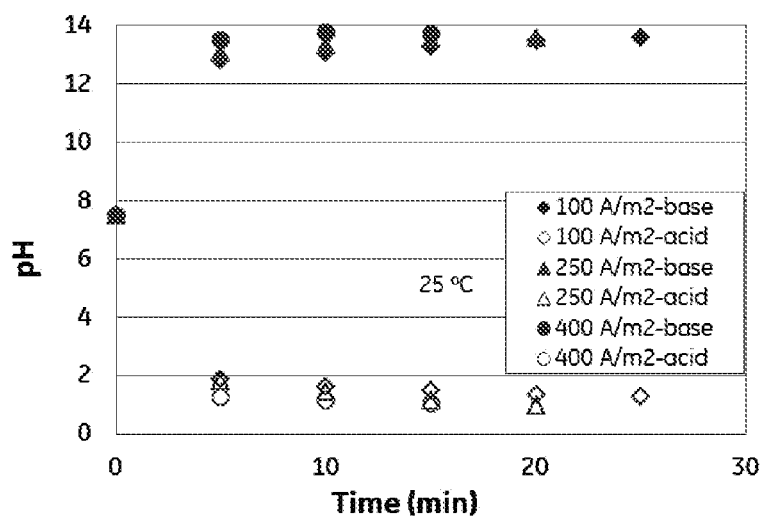
Figure 14B:
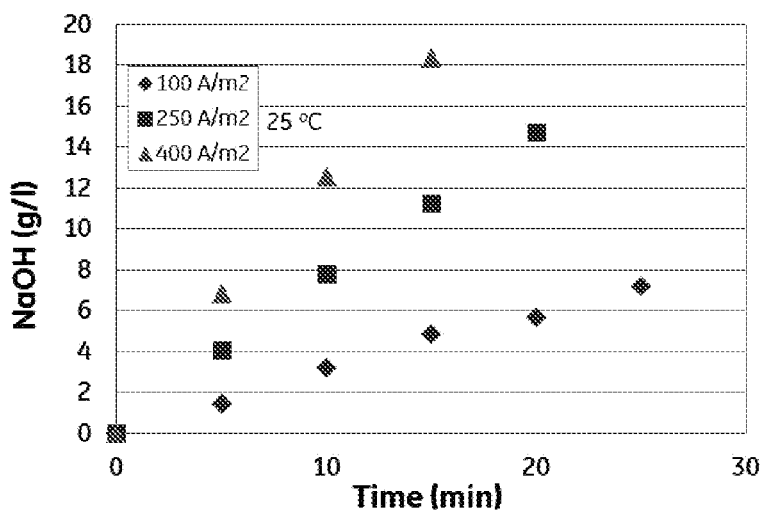
Figure 14C:
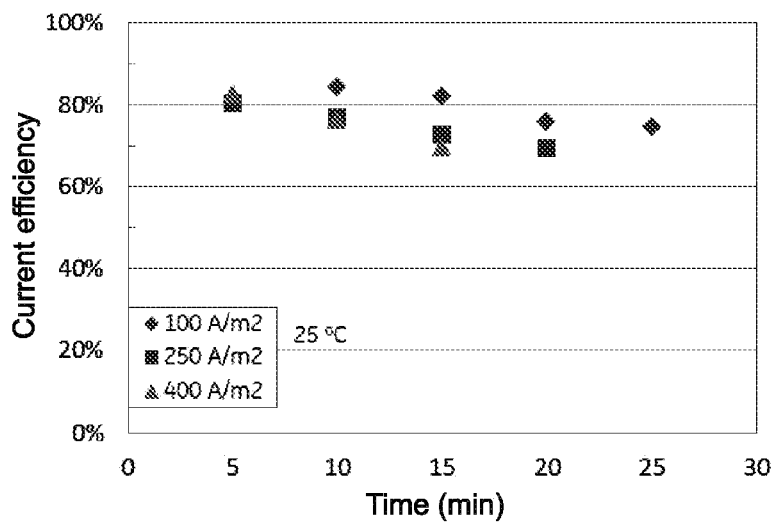
Figure 15A:
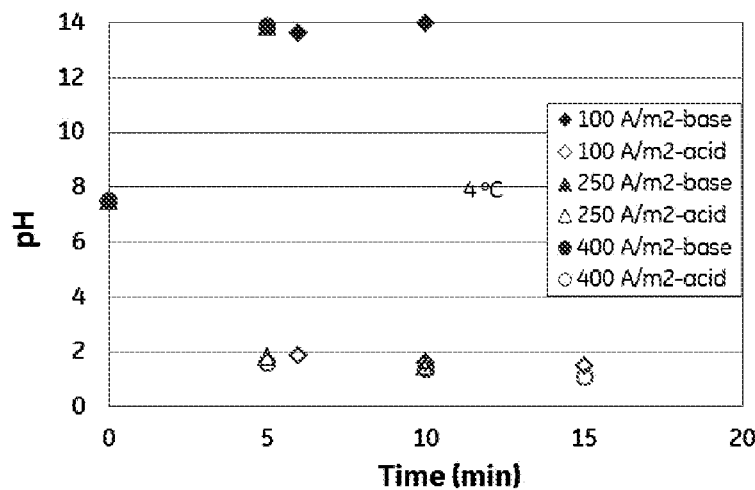
Figure 15B:
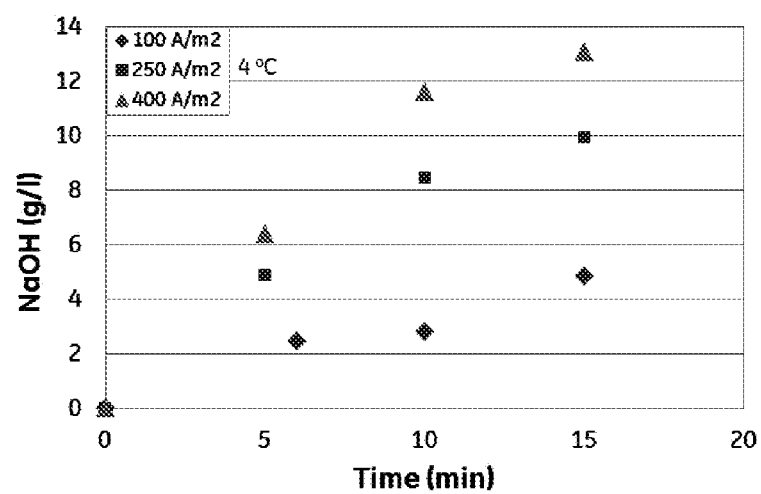
Figure 15C:
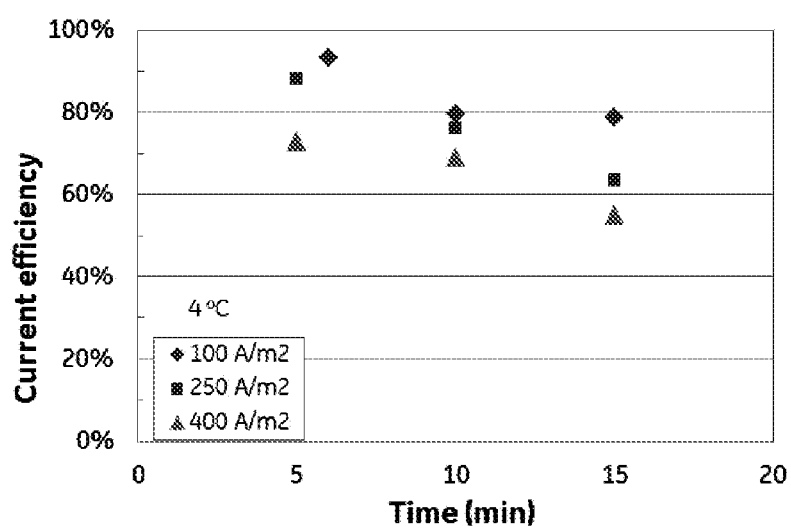
Figure 16:
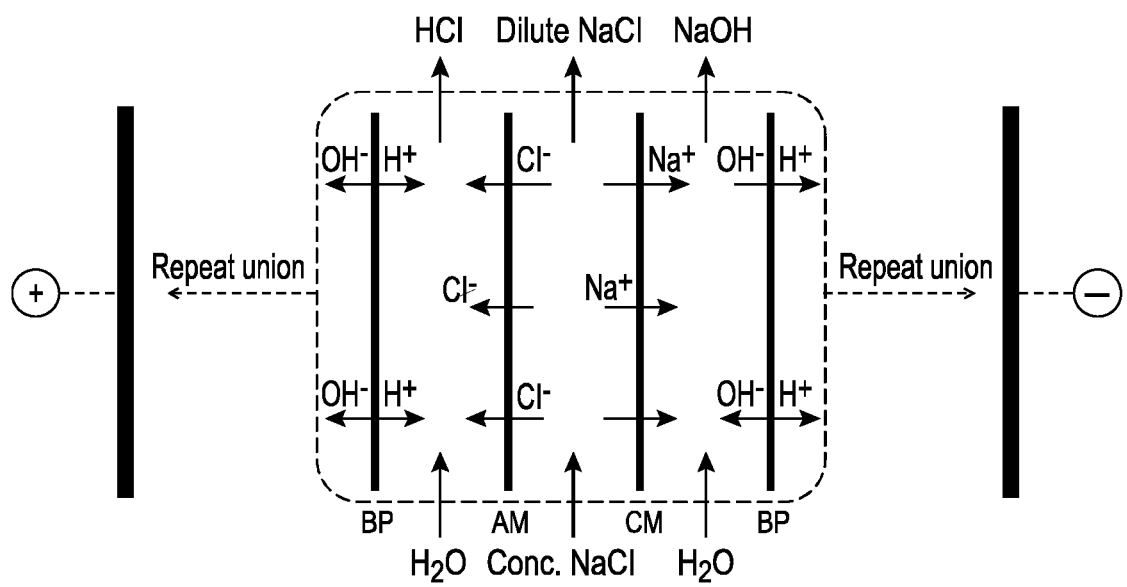

Embodiments and details of the present invention will be further discussed below with reference to the accompanying schematic drawings wherein:

FIGS. 1-13 illustrate different embodiments of the subsea water processing system, FIG. 14A is a diagram showing the pH levels of acid and base streams generated by a lab-scale bipolar membrane electro-dialysis unit (BPED), FIG. 14B is a diagram showing the concentration of generated NaOH solution, FIG. 14C is a diagram showing the current efficiency of the lab-scale acid and base generation system. All data in FIG. 14A-C were obtained with 25° C. and synthetic seawater as feed, FIG. 15A is a diagram showing the pH levels of generated acid and base streams by the lab-scale BPED unit, FIG. 15B is a diagram showing the concentration of generated NaOH solution, FIG. 15C is diagram showing the current efficiency of the lab-scale acid and base generation system. All data in FIG. 15A-C were obtained with 4° C. and synthetic seawater as feed, and FIG. 16 is a schematic illustration of a BPED cell used in the lab experiment.

DETAILED DESCRIPTION

With reference to FIG. 1 an embodiment of the subsea water processing system in the form of a water injection system 1 briefly comprises a submerged water filtration station 2, a pump 3 feeding seawater or produced water through the filtration station from an inlet 4 to a water injection pump 5 by which treated water is injected into an injection well 6 in an oil and/or gas-holding subterranean formation 7. The water injection system 1 can be controlled from a topside control station 8 via an umbilical 9. A subsea control module 10 may be included in the control of the water injection system 1.

The submerged water filtration station 2 may comprise underwater membrane separation modules of successively finer grades as seen in the feed direction of water through the system 1. The filter stages may include a coarse filtration module 11 and a fine filtration module 12.

In this context separation of particulate matter and microorganisms from seawater typically involves filtration in several stages using different types of filters or membranes. The range of separation membranes applied in seawater treatment processes covers filters or membranes included in subsea coarse filter (CF) modules and multiple media filters (MMF) modules, as well as membranes used in microfiltration (MF) modules, ultrafiltration (UF) modules, nanofiltration (NF) and reverse osmosis (RO) modules. In membrane filtration, pressure is used to force water against a semipermeable membrane capable of separating out substances from the water, mainly through size exclusion or solution-diffusion. The stages of filtration are not principally different from each other except in terms of the size of the pores and the size of species (e.g. particles, ions) they retain. In general terms the pore size or species size removal capacity of ultrafiltration membranes range from 0.005 to 0.1 micron, whereas the nanofiltration membranes range from 0.001 to 0.01 micron and the reverse osmosis membranes are capable of excluding species sizes ranging down to 0.0001 micron.

The filter membranes included in the underwater separation modules referred to in the present disclosure are not limited to the exact figures and ranges mentioned here, which are introduced as a general illustration of the different stages of filtration which can be applied in the seawater injection system 1.

For example, the coarse filtration stage 11 may be realized as a strainer or as a multiple media filter, whereas the fine filtration stage 12 may be composed of a number of ultrafiltration modules 13 disposed as indicated in the drawing of FIG. 1. The fine filtration stage may be supplemented by nanofiltration and/or desalination provided from a nanofiltration module 14 and/or a reverse osmosis module 15, if appropriate. In the drawing, reference RS refers to reject streams discharged from the membrane separation modules 11-15.

In the water injection system 1, an acid-and-base generation unit 16 is hydraulically connected to at least one of the underwater separation modules 11-15 and driven for on-site generation of acid and base cleaning solutions using ambient seawater or treated produced water as input. In the drawing the seawater or produced water input to the acid-and-base generation unit 16 (herein also referred to as the acid/base generation unit 16) is indicated by reference number 17. The acid/base generation unit 16 is connectable to the one or more membrane separation modules via acid and base solution flow lines 18 and 19 and valves 20 and 21 for optional supply of acid and base cleaning solution during a membrane cleaning cycle. Circulation of the acid and base cleaning solutions through the membrane(s) may be driven by boosting pump 3 or via a dedicated pump 22 which for this purpose is hydraulically connected to the acid/base generation unit 16 via a hydraulic circuit 23 and valves 24, 25 and 26. The hydraulic circuit 23 may be extended to other membrane separation modules in the water injection system as illustrated by broken lines in FIG. 1.

It should be noted that FIG. 1 only schematically illustrates the layout of a water injection system configuring an on-site operated and hydraulically connected acid and base generation unit 16. The hydraulic circuit which supplies acid and base cleaning solutions to the underwater separation modules may in practise include additional flow lines, directional control valves and check valves as appropriate. Supply of power and monitoring and control of the operation of the acid/base generation unit 16 and the membrane cleaning cycle may be accomplished via an umbilical 9 and the topside control module 8 or the subsea control module 10, as indicated in the drawing by the continuous line 27.

Embodiments of the water injection system comprise one or more underwater membrane separation modules including any of an underwater coarse filter membrane (CF), a multiple media filter membrane (MMF), a microfiltration filter membrane (MF), an ultrafiltration filter membrane (UF), a nanofiltration filter membrane (NF) or a reverse osmosis filter membrane (RO).

Figure 2:
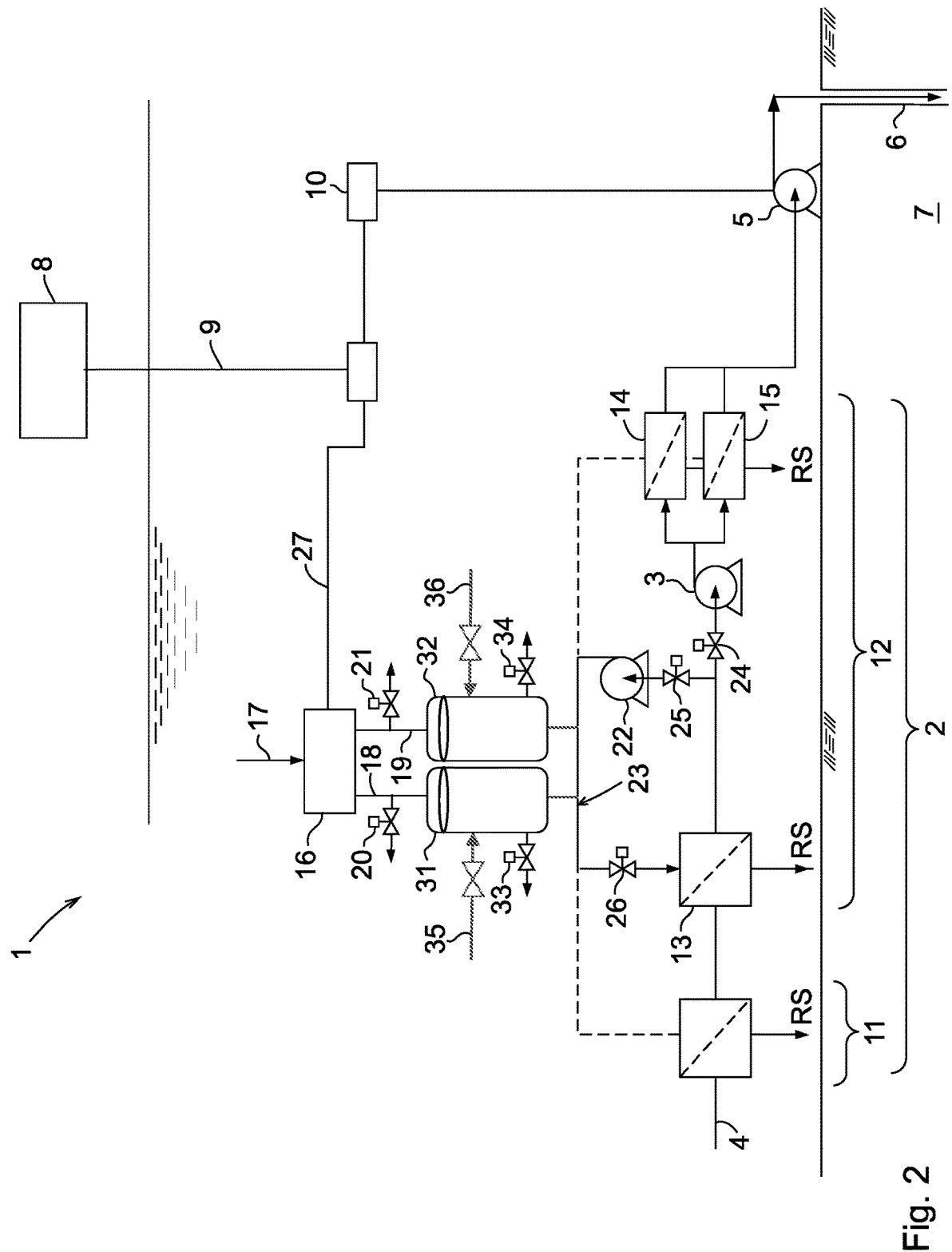

FIG. 2 shows a modified embodiment of the subsea water processing system 1 of FIG. 1. Similar to the embodiment of FIG. 1 the generated acids and bases are used for chemical cleaning of membranes. The embodiment of FIG. 2 comprises additional mixing or storage vessels 31 and 32. Vessels 31 are used for storage of generated acid and base cleaning solution. A nanofiltration (NF) permeate stream 35 is supplied to control the pH levels and concentration of the acid and base streams. Vessels 31 and 32 may be used for storage of CIP wastes before neutralization and discharge. In FIG. 2 reference numbers 33 and 34 point towards discharge valves.

Figure 3:
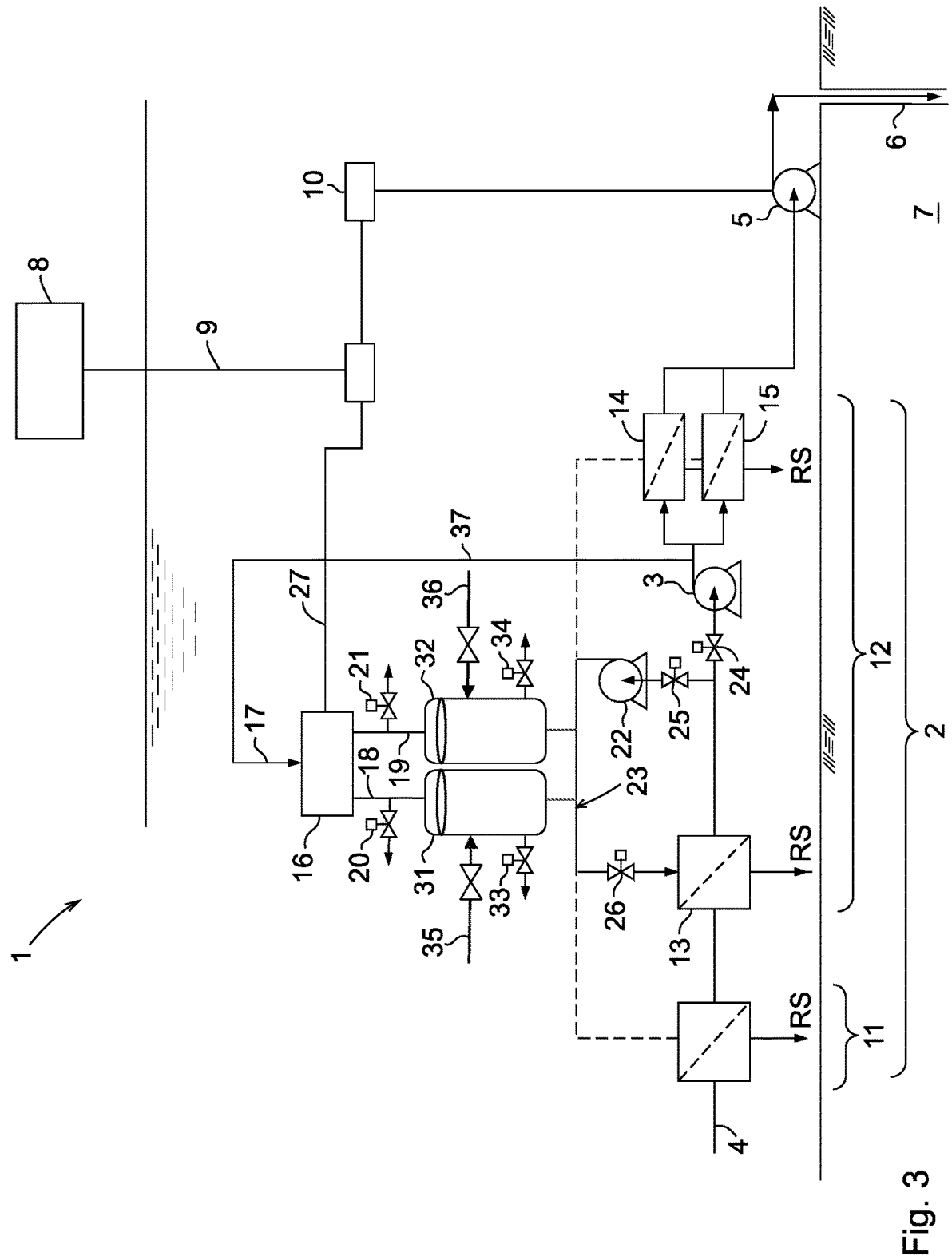

FIG. 3 shows a modified embodiment of the subsea water processing system 1 of FIG. 2. Similar to the embodiments of FIGS. 1 and 2 the generated acids and bases are used for chemical cleaning of membranes. The embodiment of FIG. 3 comprises use of an ultrafiltration (UF) permeate stream 37 to feed the acid and base generation unit 16 (as compared to using raw seawater or treated produced water to feed the acid and base generation unit as in the embodiments of FIGS. 1 and 2).

Figure 4:
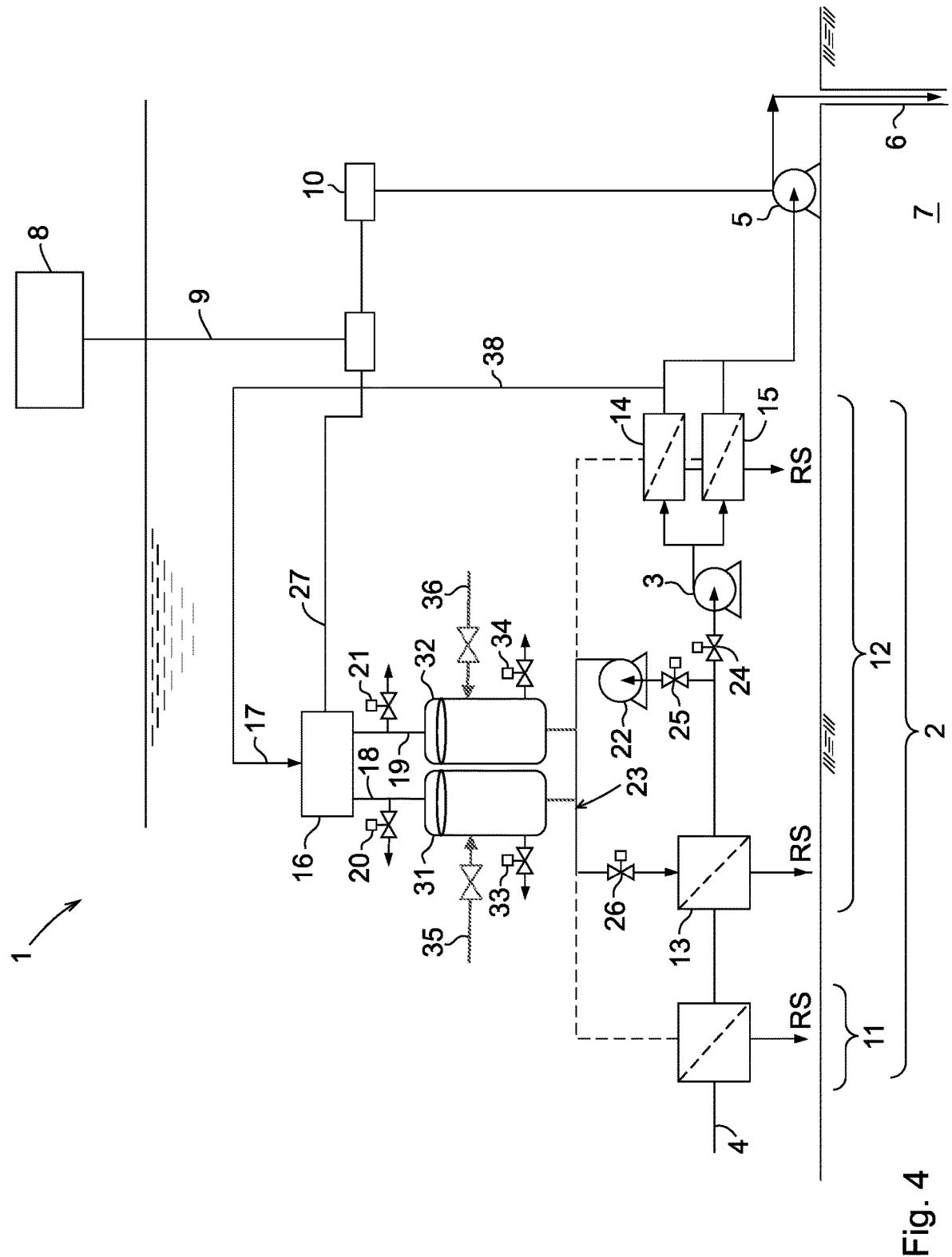

FIG. 4 shows a modified embodiment of the subsea water processing system 1 of FIG. 3. Similar to the embodiments of FIGS. 1-3 the generated acids and bases are used for chemical cleaning of membranes. The embodiment of FIG. 4 comprises use of a nanofiltration (NF) permeate stream 38 to feed the acid and base generation unit 16 (as compared to using raw seawater or UF to feed the acid and base generation unit as in FIGS. 1-3).

Because of the capacity of a nanofiltration membrane to remove divalent and reactive calcium and magnesium ions from the water to be supplied to the cells of the acid and base generation unit the problem of scaling and deposition of calcium carbonate $CaCO_3$ and magnesium hydroxide $Mg(OH)_2$ crystals in an electrochemical cell or in downstream filters and membranes will be substantially reduced or completely avoided. Nanofiltrate is relatively free from divalent ions such as $Ca^{2+}$ and $Mg^{2+}$, species known to foul electrochemical cells. As a result, the nanofiltrate that is fed into the acid and base generation unit will be relatively free of $Ca^{2+}$ and $Mg^{2+}$ while being rich in useful halide salts such as sodium chloride.

Figure 5:
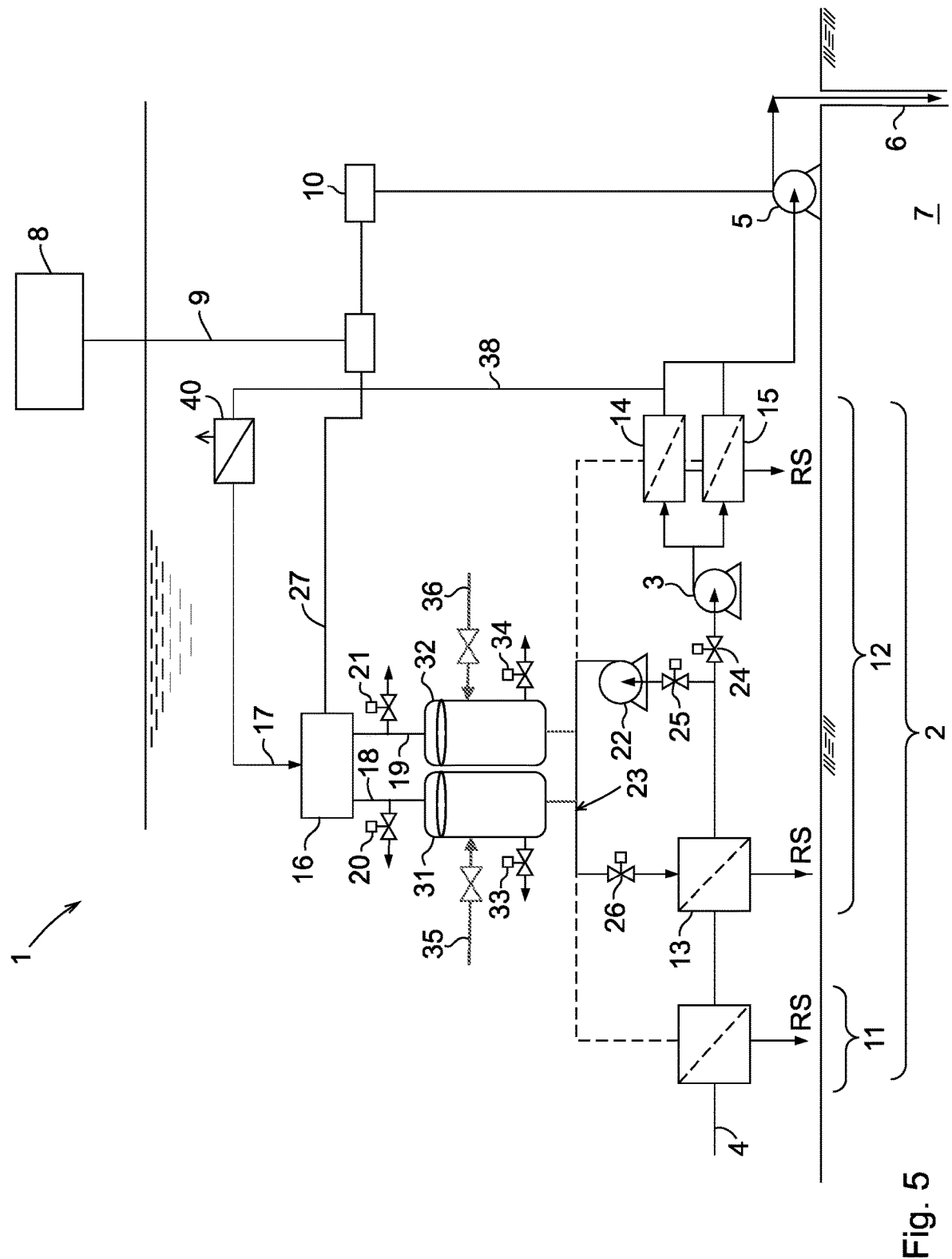

FIG. 5 shows a modified embodiment of the subsea water processing system 1 of FIG. 4. Similar to the previous embodiments the generated acids and bases are used for chemical cleaning of membranes. In the embodiment of FIG. 5 the NF permeate 38 is further filtrated by a second NF stage 40 to further reduce $Ca^{2+}$ and $Mg^{2+}$ concentration to prevent scaling in the acid and base generation unit 16.

Raw seawater has the combined concentration of $Ca^{2+}$ and $Mg^{2+}$ ions of approximately ~1500 to 2000 mg/L. After one NF stage, their combined concentration of 80 to 120 mg/L may still have the potential to foul electrodes and membranes. After a second NF stage, the combined concentration of $Ca^{2+}$ and $Mg^{2+}$ is in the range of 20-40 mg/L, a greatly reduced fouling potential of the electrochemical cells.

The concentrate stream from the NF stage 40 can be either discharged, sent as RO feed, or be injected into wells for IOR.

Figure 6:
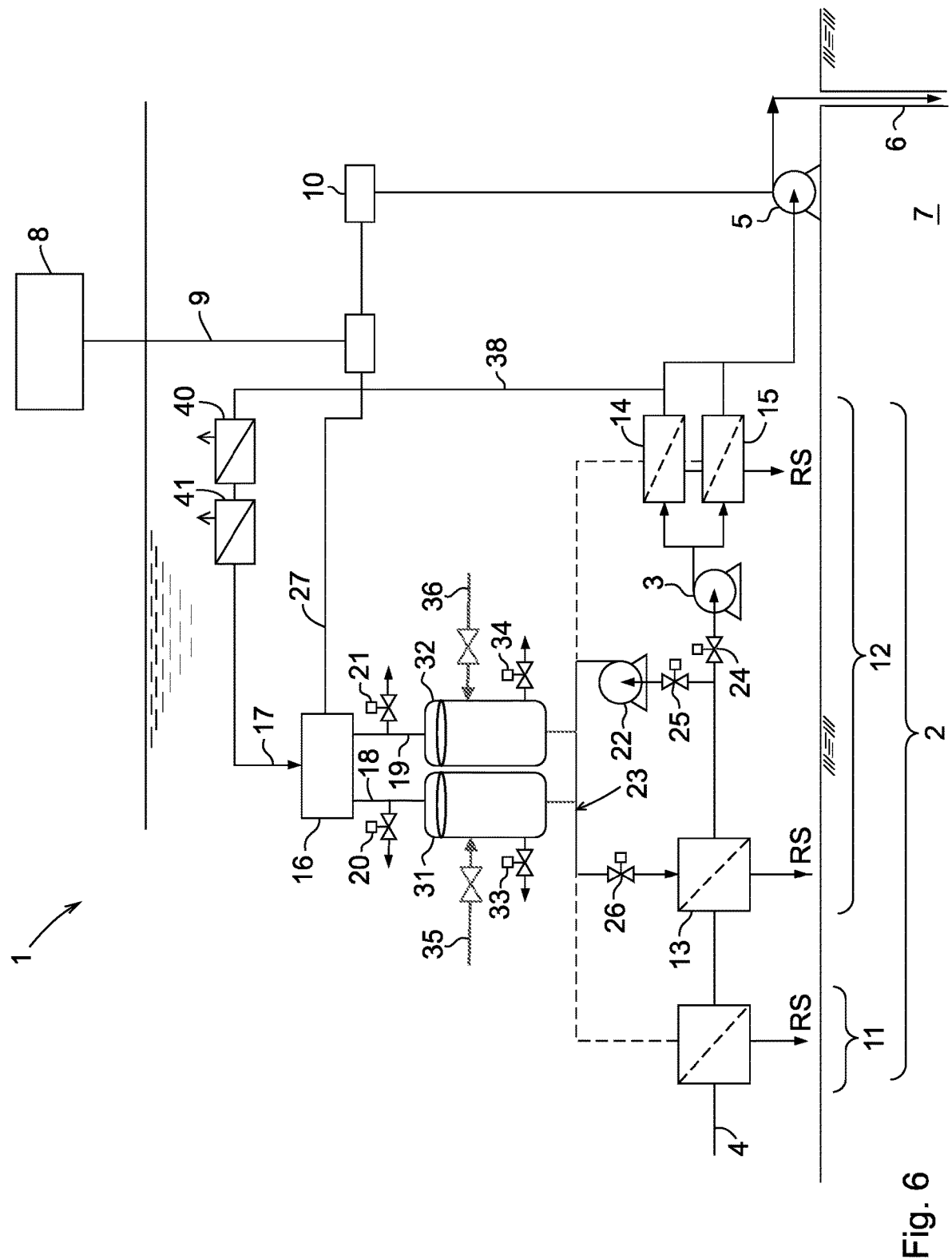

FIG. 6 shows a modified embodiment of the subsea water processing system 1 of FIG. 5. Similar to the previous embodiments the generated acids and bases are used for chemical cleaning of membranes. In the embodiment of FIG. 6 the NF permeate 38 is further filtrated by a third NF stage 41 to further reduce $Ca^{2+}$ and $Mg^{2+}$ concentration to prevent scaling in the acid and base generation unit 16.

After a third NF stage the combined concentration of $Ca^{2+}$ and $Mg^{2+}$ ions are less than 10 mg/L, effectively mitigating the fouling of electrodes and membranes in the cells of the acid and base generation unit.

The concentrate stream from NF stages 40 and 41 can be either discharged, sent as RO feed, or be injected into wells for IOR.

Figure 7:
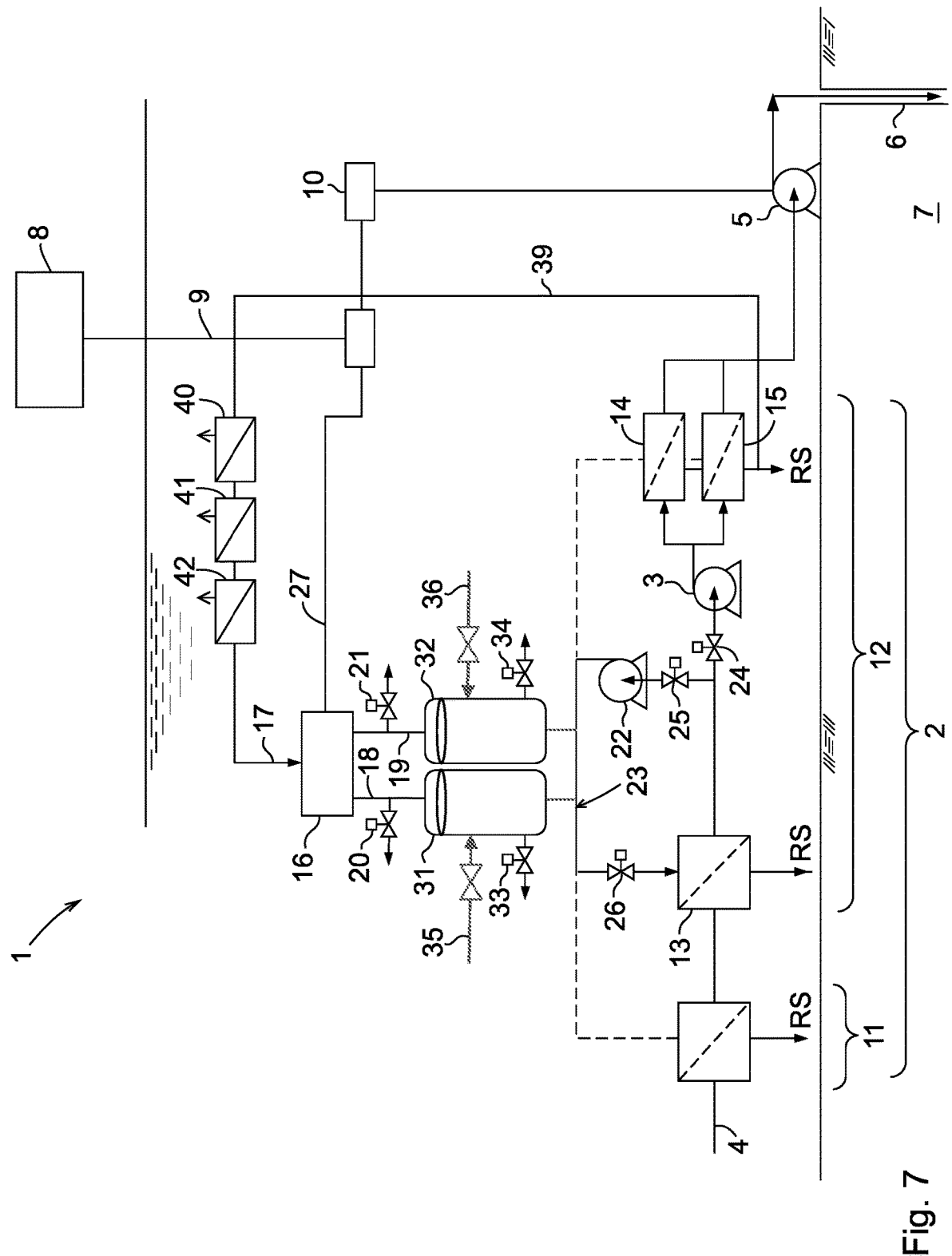

FIG. 7 shows a modified embodiment of the subsea water processing system 1 of FIG. 6. Similar to the previous embodiments the generated acids and bases are used for chemical cleaning of membranes. In the embodiment of FIG. 7 a RO concentrate (i.e. reject) stream 39 (instead of NF permeate stream 38) is passed to three-stage NF membrane units 40-42 to remove Ca and Mg ions, and subsequently fed into the acid and base generation unit 16.

An advantage of using RO concentrate stream to feed the acid and base generation unit is that this stream is rich in useful halide salts such as sodium chloride (2× of typical seawater) while it will be relatively free of $Ca^{2+}$ and $Mg^{2+}$, the fouling species after NF treatment.

Figure 8:
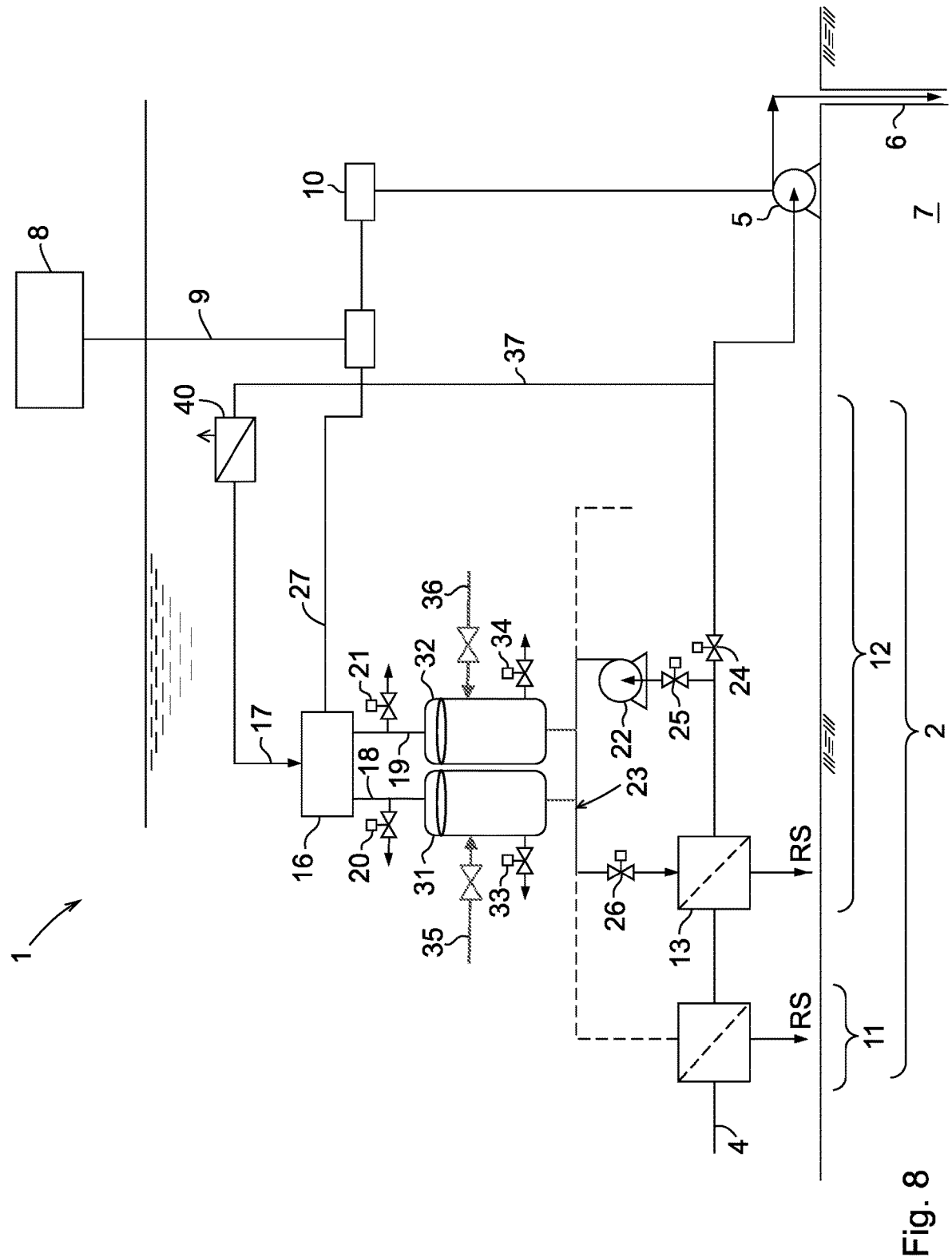

FIG. 8 shows an embodiment of the subsea water processing system in which only coarse and UF treated water is injected into oil wells, i.e. no NF and RO units are included in the main treatment train.

In the embodiment shown, UF permeate 37 is further filtrated by a single stage, smaller NF membrane unit 40 to reduce $Ca^{2+}$ and $Mg^{2+}$ concentration to prevent scaling in the acid and base generation unit 16. As in previous embodiments the generated acids and bases are used for chemical cleaning of membranes. The concentrate stream from the NF stage 40 can be either discharged, sent as RO feed, or be injected into wells for IOR.

Figure 9:
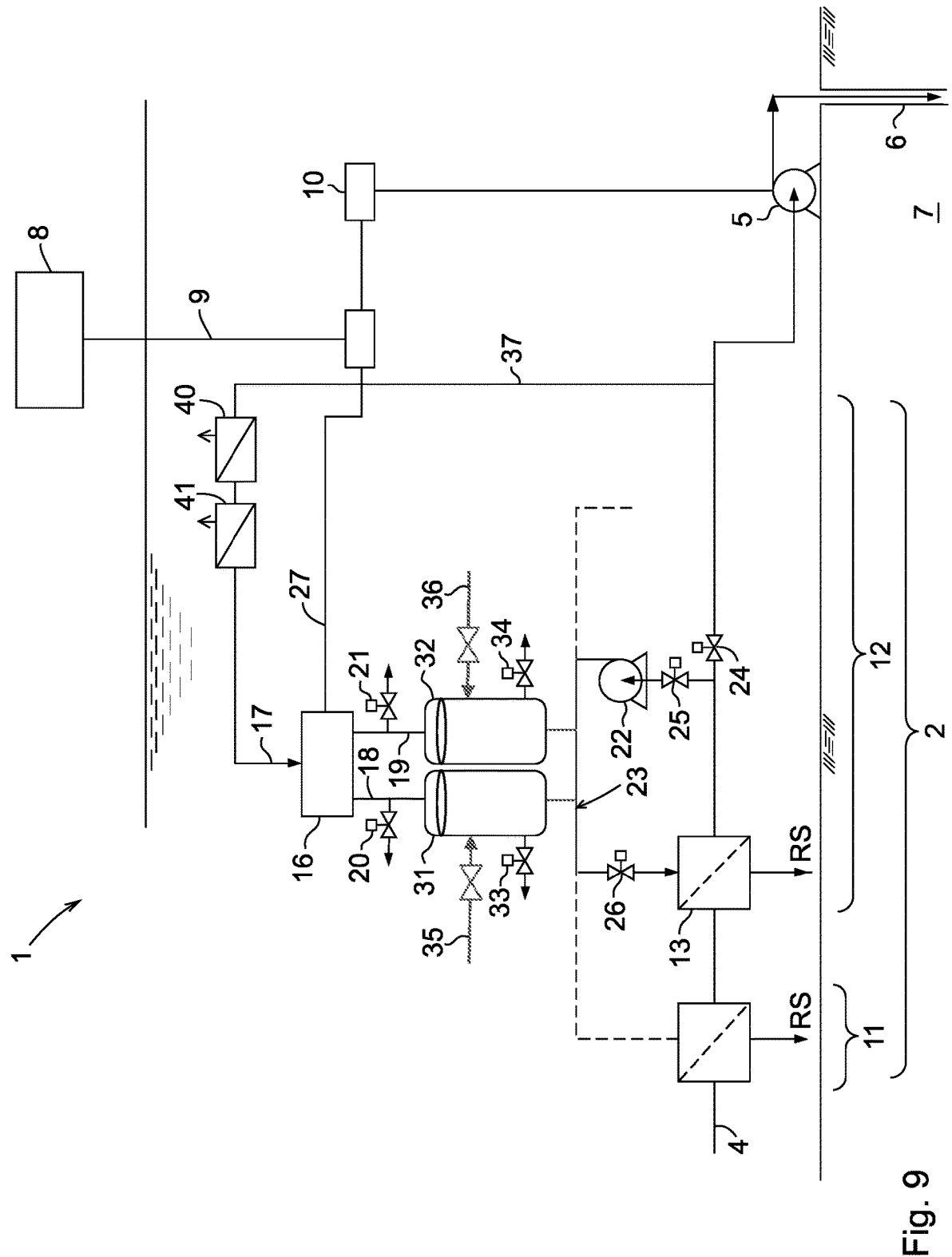

FIG. 9 shows a modified embodiment of the subsea water processing system 1 of FIG. 8. Similar to the previous embodiments the generated acids and bases are used for chemical cleaning of membranes. In the embodiment of FIG. 9 the UF permeate 37 is further filtrated by two-stage NF membrane units 40 and 41 to reduce $Ca^{2+}$ and $Mg^{2+}$ concentration to prevent scaling in the acid and base generation unit 16.

The concentrate stream from the NF stages 40 and 41 can be either discharged, sent as RO feed, or be injected into wells for IOR.

Figure 10:
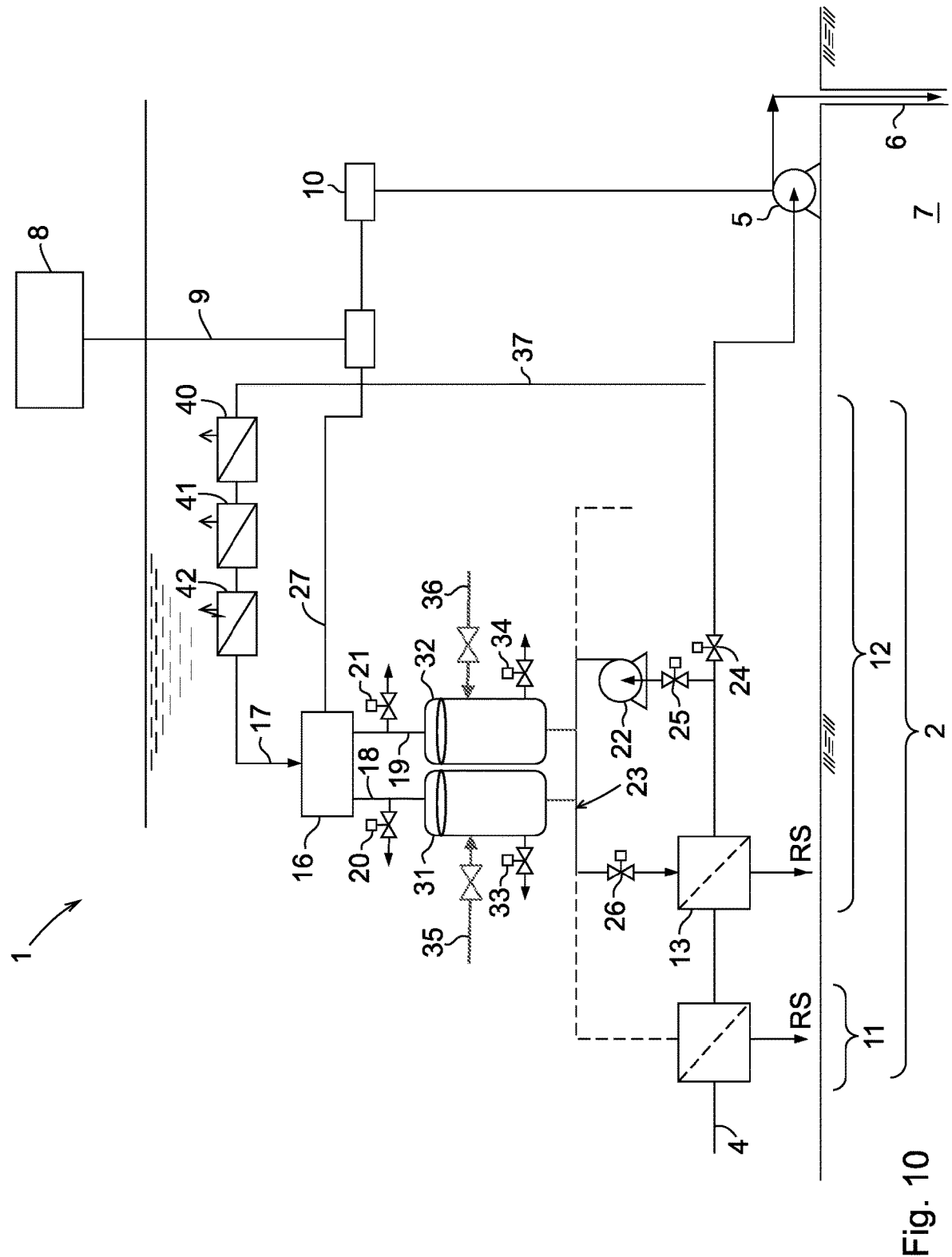

FIG. 10 shows a modified embodiment of the subsea water processing system 1 of FIG. 9. Similar to the previous embodiments the generated acids and bases are used for chemical cleaning of membranes. In the embodiment of FIG. 10 the UF permeate 37 is further filtrated by three-stage NF membrane units 40-42 to reduce $Ca^{2+}$ and $Mg^{2+}$ concentration to prevent BPED scaling. The concentrate stream from units 40, 41, and 42 can be either discharged, sent as RO feed, or be injected into wells for IOR.

Figure 11:
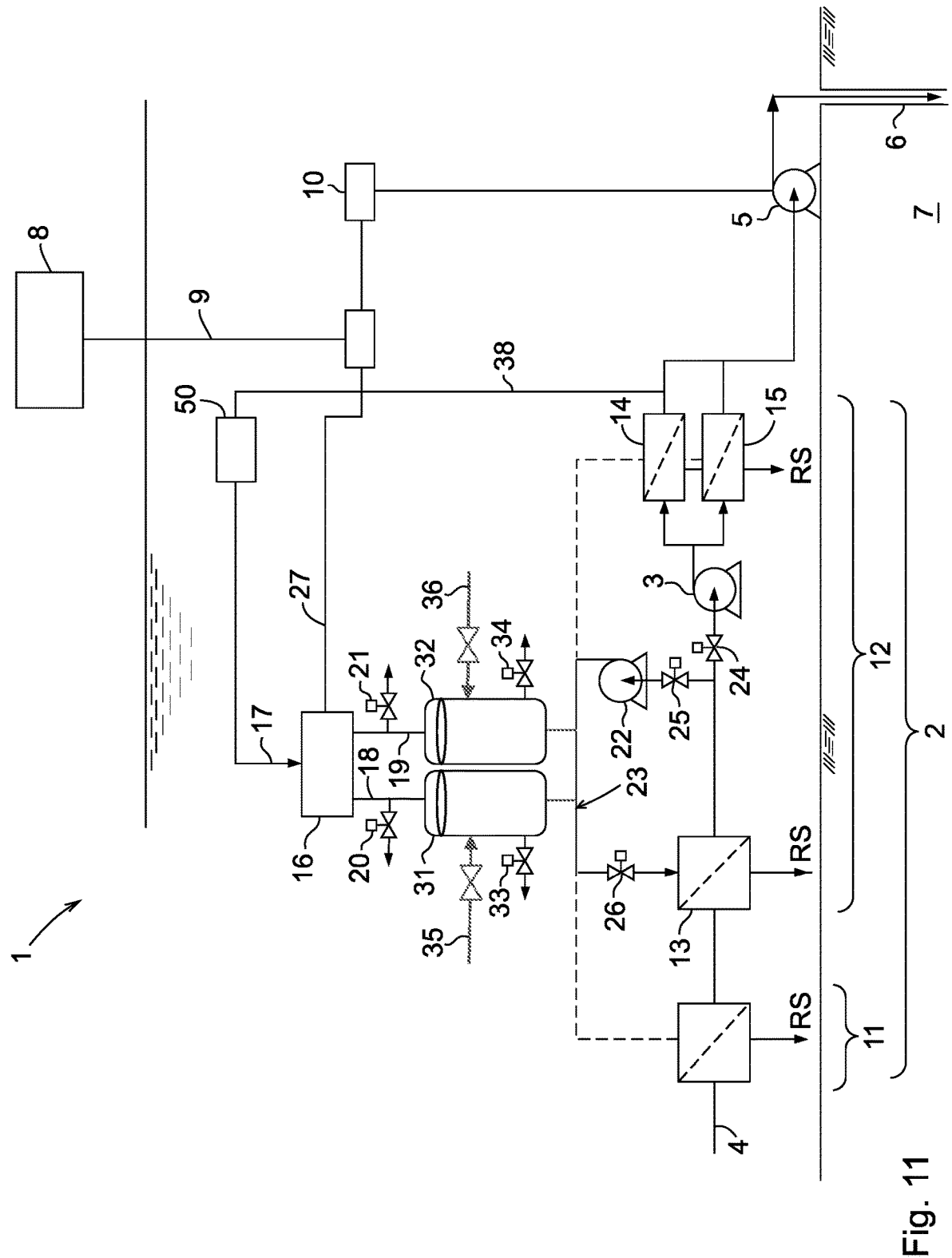

FIG. 11 shows a modified embodiment of the subsea water processing system 1 of FIG. 8. Similar to the previous embodiments the generated acids and bases are used for chemical cleaning of membranes. In the embodiment of FIG. 11 the NF permeate 38 is further softened by an ion exchange unit 50 (instead of NF membrane unit) to reduce $Ca^{2+}$ and $Mg^{2+}$ concentration to prevent scaling in the acid and base generation unit 16.

Figure 12:
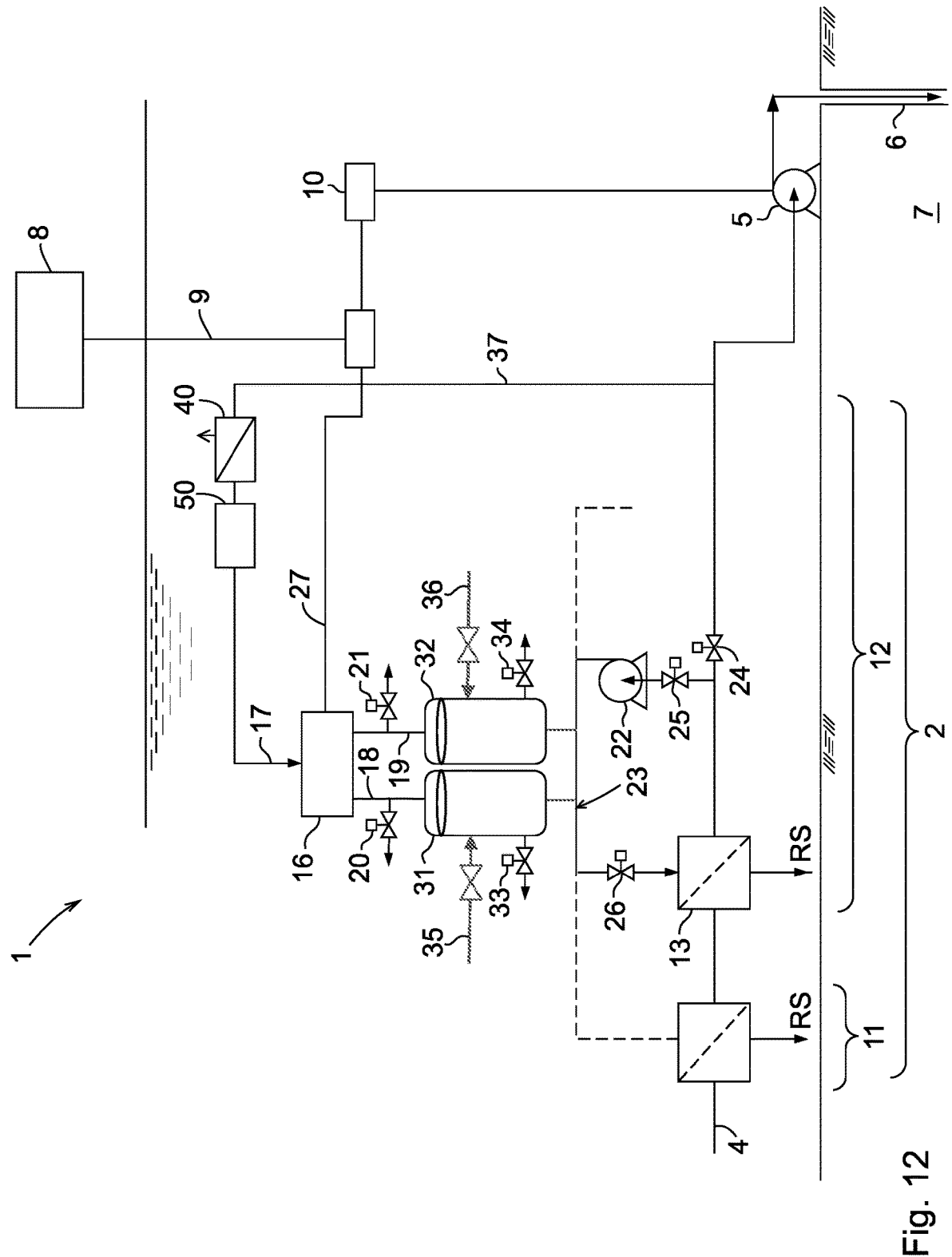

FIG. 12 shows a modified embodiment of the subsea water processing system 1 of FIG. 8. Similar to the previous embodiments the generated acids and bases are used for chemical cleaning of membranes. In the embodiment of FIG. 12 the UF permeate 37 is further filtrated by a combination of a NF membrane unit 40 and an ion exchange unit 50 to reduce $Ca^+$ and $Mg^{2+}$ concentration to prevent scaling in the acid and base generation unit 16.

FIG. 13 shows a modified embodiment of the subsea water processing system 1 of FIG. 7. In the embodiment of FIG. 13 a subsea water processing system comprises a heat exchanger 60. Seawater passes through coarse filter 11, UF filter 13, NF filter 40, and is subsequently fed into the acid and base generation unit 16. The generated acids and bases are used for chemical cleaning of the heat exchanger 60.

In embodiments of the subsea water processing system the acid/base generation unit is via the hydraulic circuit connectable on-site to at least one underwater membrane separation module including any of a single-bore or multi-bore hollow fibre membrane, a plate-and-frame membrane or a spiral wound membrane.

Embodiments of the water injection system include an acid/base generation unit that is via the hydraulic circuit connectable on-site to at least one underwater membrane separation module arranged to operate at outside-in or at inside-out flow pattern and at either dead-end or cross-filtration mode.

Further embodiments of the water injection system include the acid/base generation unit which via a hydraulic circuit is connectable on-site to at least one underwater separation module(s) located on the seabed, or underwater near the surface, or attached to a floating platform.

Embodiments of the invention include applications wherein the acid/base generation unit is operated as stand-alone unit, or in assemblies where filtration elements are located upstream only to serve the acid/base generation unit. Examples include any combination of the acid/base generation unit and an upstream coarse filtration membrane, or upstream located coarse and ultrafiltration membranes, or coarse filtration, ultrafiltration and nanofiltration membranes all sequentially installed in the water feed upstream of the acid/base generation unit.

It is further contemplated that the pump or pumps to feed seawater through the membranes or other subsea process apparatus can be installed at any desired location within the assembly. High pressure injection pumps may be required for reservoir stimulation. It is further contemplated that the acid/base generation unit can be equipped to produce highly concentrated or more dilute acid or base solutions at concentrations suitable for a particular process.

Any of the above options may be available for on-site production of chemicals for subsea filter membranes, subsea heat exchangers, pipes and flow lines and other subsea process equipment, for injection and production wells etc.

Experiments

Proof-of-concept lab experiments have demonstrated the capability to produce acid and base from seawater on-site and on-demand. FIGS. 14 and 15 show lab-scale experimental results obtained using a bipolar membrane electro-dialysis unit (BPED) and synthetic seawater as feed at both room temperature and subsea temperature (4° C.).

Salts for making synthetic seawater for this experiment include KCl, $MgCl_2$, $CaCl_2$, NaCl, and $NaHCO_3$ (all from Sinopharm Chemical Reagent Co., Ltd). Acid and basic solutions were prepared from concentrated hydrochloric acid solution and solid NaOH (Sinopharm Chemical Reagent Co., Ltd).

Experiments were conducted using a BPED stack obtained from GE Power & Water. FIG. 16 shows the schematic of one unit included in the BPED stack, which comprises 6 such units. The single BPED unit consists of one anion exchange membrane (AM), one cation exchange membrane (CM) and a composite bipolar membrane (BP) made of a cation exchange membrane and an anion exchange membrane. During operation, charging of the stack induces a water splitting reaction at the surface of the bipolar membranes and protons and hydroxide ions are generated. In addition, a reduction reaction occurs at the surface of the cathode as hydrogen and hydroxide ions are generated, and a corresponding oxidation reaction occurs at the surface of the anode as oxygen and protons are produced.

For the lab-scale set-up an electrochemical charging system (Germany Digatron power electronics Co., Ltd) was connected to the two electrodes of the BPED stack to supply certain current and voltage. A SevenMulti pH and conductivity meter (Metler Toledo) was used to identify the pH level of generated alkali and acid. It was also used to identify the conductivity level of synthetic seawater during the experiment. Fresh synthetic seawater was added into the system when the conductivity dropped during the experiment. A pump (LongerPump) was used to pump synthetic seawater into the BPED stack and acid/base out of the BPED stack to form a recirculating system. A thermostatic water bath (Fisher Scientific) was used to keep synthetic seawater at a constant temperature. Finally a stirrer (Heidolph instruments) was used to keep the concentration of synthetic seawater uniform.

The results shown in FIGS. 14A and 15A indicate that the pH of the base stream quickly reached 10-12 and higher; and the pH of the acid stream reached 2-3.5 or lower within minutes, adequate for membrane cleaning purpose. FIGS. 14B and 15B show that the concentration of the base can reach 2 to 18 g/L, or 0.2 to 1% (wt), depending on the reaction time, power density, and temperature. Increase in the charging current and the temperature accelerates alkali/acid generation rates due to stronger electrical field and faster ion mobility. The penalty with higher current density is higher energy consumption. 100, 250, and 400 $mA/m^2$ were used in the experiments. The current efficiency was found to be in the range of 60% to 85% range for all experiments. At 4° C. and at higher current density, the current efficiency lowered slightly as compared with room temperature current efficiency due to the slower ion mobility.

The lab experiments demonstrate the feasibility of using an electro-dialysis unit to generate base and acid on-demand, on-site, for CIP (cleaning in place) of membranes and other subsea process apparatus. Obviously, the recited lab experiment was conducted on a BPED unit with relatively small membrane area, and the system was in recirculation mode. Commercial BPED units provide considerably larger membrane areas such that the feed water usually is in one-through mode (as in contrast to recirculation), to produce acid and base directly, no recirculation is needed.

The demonstrated on-site generation of acid and base from seawater offers great advantages when compared to marinization of conventional onshore CIP system. These advantages include eco-friendliness, much lower weight and footprint, greatly reduced CAPEX (capital expenditures) and OPEX (operation expenditures), and excellent robustness. In addition, the acid/base generation unit's modular design guarantees up-scalability.

The scope of the present invention as disclosed above and in the drawings, is defined by the appended claims, covering the embodiments disclosed and modifications which can be derived therefrom without leaving the scope of the invention.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What we claim is:

1. A subsea water processing system comprising:
   at least one underwater membrane separation module of a water injection system arranged in a feed line from a seawater or oil field produced water intake to a water injection pump;
   an electrochemical acid and base generation unit operable for on-site generation of high PH and low PH cleaning solutions using seawater or oil field produced water in an electrochemical process; and
   acid or base flow lines and valves connecting the electrochemical acid and base generation unit on-site with the at least one underwater membrane separation module to supply high PH and low PH cleaning solutions for circulation through the at least one underwater membrane separation module during a membrane cleaning cycle.

2. The system of claim 1, wherein the acid or base flow lines connect the electrochemical unit with at least one subsea process apparatus on-site, the at least one subsea process apparatus selected from the group consisting of heat exchangers, components of a hydrocarbon production system, pipelines, injection or production wells, pumps for injecting acid into a reservoir formation for reservoir stimulation, and water injection systems.

3. The system of claim 2, wherein the electrochemical acid and base generation unit can supply low PH solution for injection into a corresponding reservoir formation for hydrocarbon production stimulation.

4. The system of claim 1, wherein the electrochemical acid and base generation unit is operable to produce a high pH solution having a pH higher than 9.5, and the electrochemical acid and base generation unit is operable to produce a low pH solution having a pH lower than 4.

5. The system of claim 1, wherein the electrochemical acid and base generation unit is an electrolysis unit without membranes.

6. The system of claim 1, wherein the electrochemical acid and base generation unit is an electrolysis unit with membranes.

7. The system of claim 1, wherein the electrochemical acid and base generation unit is a bipolar membrane electrodialysis unit.

8. The system of claim 1, wherein the electrochemical acid and base generation unit is a bipolar membrane electrodialysis unit with a 2-compartment design or a 3-compartment design.

9. The system of claim 1, further comprising a nanofiltration stage and/or an ion exchange unit operable to treat feed water to the electrochemical acid and base generation unit such that the feed water to the electrochemical acid and base generation unit has a combined Ca2+ and Mg2+ ions level below 10,000 mg/L.

10. The system of claim 1, further comprising a nanofiltration stage operable to treat feed water to the electrochemical acid and base generation unit with nanofiltration and/or an ion exchange unit operable to treat the feed water to the electrochemical acid and base generation unit with ion exchange, to substantially remove Ca2+ and Mg2+ ions.

11. The system of claim 1, wherein the electrochemical acid and base generation unit feeds, via a hydraulic circuit hydraulically connected to a boosting pump, seawater or oil field produced water through the at least one underwater membrane separation module in normal operation.

12. The system of claim 11, wherein the electrochemical acid and base generation unit is a bipolar membrane electrodialysis unit.

13. The system of claim 11, wherein the electrochemical acid and base generation unit is via a hydraulic circuit connectable on-site with at least one of the at least one underwater membrane separation module including any of an underwater coarse filter membrane, a multiple media filter membrane, a microfiltration filter membrane, an ultrafiltration filter membrane, a nanofiltration filter membrane or a reverse osmosis filter membrane.

14. The system of claim 11, wherein the electrochemical acid and base generation unit is via a hydraulic circuit connectable on-site to at least one of the at least one underwater membrane separation module including any of a single-bore or multi-bore hollow fiber membrane, a plate-and-frame membrane, a tubular membrane, or a spiral wound membrane.

15. The system of claim 1, wherein the electrochemical acid and base generation unit feeds, via a hydraulic circuit hydraulically connected to a boosting pump, seawater or oil field produced water through the at least one underwater membrane separation module in normal operation.

16. The system of claim 15, wherein the electrochemical acid and base generation unit further feeds, via the hydraulic circuit hydraulically connected to the boosting pump, acid or base cleaning solution through the at least one underwater membrane separation module during a membrane cleaning cycle.

17. The system of claim 15, wherein the electrochemical acid and base generation unit further feeds, via the hydraulic circuit hydraulically connected to the boosting pump acid or base cleaning solution through the at least one underwater membrane separation module during a membrane cleaning cycle.

18. The system of claims 1, wherein the electrochemical acid and base generation unit is via a hydraulic circuit connected on-site to at least one of the at least one underwater membrane separation module including any of a single-bore or multi-bore hollow fiber membrane, a plate-and-frame membrane, a tubular membrane, or a spiral wound membrane.

19. The system of claim 1, further comprising a nanofiltration stage and/or an ion exchange unit operable to treat feed water to the electrochemical acid and base generation unit such that the feed water to the electrochemical acid and base generation unit has a combined Ca2+ and Mg2+ ions level below 200 mg/L.

20. The system of claim 1, further comprising a nanofiltration stage and/or an ion exchange unit operable to treat feed water to the electrochemical acid and base generation unit such that the feed water to the electrochemical acid and base generation unit has a combined Ca2+ and Mg2+ ions level below 10 mg/L.

* * * * *